United States Patent
Raether et al.

(10) Patent No.: US 9,751,036 B2
(45) Date of Patent: Sep. 5, 2017

(54) FILTER CARTRIDGE; COMPONENTS THEREOF; AND METHODS

(71) Applicant: Donaldson Company, Inc., Minneapolis, MN (US)

(72) Inventors: Thomas D. Raether, St. Louis Park, MN (US); Brian Zauner, Lakeville, MN (US); Mark Belcher, Burnsville, MN (US); Gabriel Safarian, Deephaven, MN (US)

(73) Assignee: Donaldson Company, Inc., Minneapolis, MN (US)

(*) Notice: Subject to any disclaimer, the term of this patent is extended or adjusted under 35 U.S.C. 154(b) by 413 days.

(21) Appl. No.: 13/947,833

(22) Filed: Jul. 22, 2013

(65) Prior Publication Data

US 2013/0298511 A1    Nov. 14, 2013

Related U.S. Application Data

(63) Continuation of application No. 12/712,845, filed on Feb. 25, 2010, now Pat. No. 8,491,684.

(60) Provisional application No. 61/156,278, filed on Feb. 27, 2009.

(51) Int. Cl.
| | |
|---|---|
| *B01D 41/00* | (2006.01) |
| *B01D 45/18* | (2006.01) |
| *B01D 46/04* | (2006.01) |
| *B01D 46/52* | (2006.01) |
| *B01D 46/00* | (2006.01) |

(52) U.S. Cl.
CPC ......... *B01D 46/528* (2013.01); *B01D 46/002* (2013.01); *B01D 46/0005* (2013.01); *B01D 46/525* (2013.01); *B01D 2275/206* (2013.01)

(58) Field of Classification Search
CPC ......... B01D 39/00–39/20; B01D 24/00; B01D 50/00; B01D 13/00; B01D 23/00; B01D 51/00; B01D 46/04; B01D 46/0068; B01D 46/0071; B01D 46/0065; B01D 2273/28
USPC .... 55/522–524, 294; 422/169–172, 177–182
See application file for complete search history.

(56) References Cited

U.S. PATENT DOCUMENTS

| | | |
|---|---|---|
| 1,781,254 A | 11/1930 | Stelzner |
| 2,599,604 A | 6/1952 | Bauer et al. |
| 3,144,315 A | 8/1964 | Hunn |
| 3,372,533 A | 3/1968 | Rummel |
| 4,157,899 A | 6/1979 | Wheaton |
| 4,310,419 A | 1/1982 | Nara et al. |
| 4,331,459 A | 5/1982 | Copley |
| 4,439,321 A | 3/1984 | Taki et al. |
| 4,617,072 A | 10/1986 | Merz |
| 4,833,883 A | 5/1989 | Oda et al. |
| 5,066,400 A | 11/1991 | Rocklitz et al. |
| 5,454,947 A | 10/1995 | Olapinski et al. |
| 5,460,790 A | 10/1995 | Shustorovich et al. |

(Continued)

FOREIGN PATENT DOCUMENTS

WO    WO 2008/106375 A2    9/2008

OTHER PUBLICATIONS

Invitation to Pay Additional Fees with Partial International Search mailed May 19, 2010.

*Primary Examiner* — Amber R Orlando
(74) *Attorney, Agent, or Firm* — Merchant & Gould P.C.

(57) ABSTRACT

Z-filters capable of cleaning particulate matter from airflow streams in dust collectors, including reverse flow, reverse air, and reverse pulse systems.

7 Claims, 25 Drawing Sheets

(56) References Cited

U.S. PATENT DOCUMENTS

| | | |
|---|---|---|
| 5,472,463 A | 12/1995 | Herman et al. |
| 5,512,172 A | 4/1996 | Marble |
| 5,562,825 A | 10/1996 | Yamada et al. |
| 5,622,583 A | 4/1997 | Ernst et al. |
| 5,722,018 A | 2/1998 | Hart et al. |
| 5,820,646 A | 10/1998 | Gillingham et al. |
| 5,895,574 A | 4/1999 | Friedmann et al. |
| 5,944,859 A | 8/1999 | Lippert et al. |
| 6,036,752 A | 3/2000 | Reuter |
| 6,056,796 A | 5/2000 | Chiang et al. |
| 6,190,432 B1 | 2/2001 | Gieseke et al. |
| 6,235,195 B1 | 5/2001 | Tokar |
| 6,238,561 B1 | 5/2001 | Liu et al. |
| 6,949,131 B2 | 9/2005 | Yeung |
| 7,195,659 B2 | 3/2007 | Sporre et al. |
| 7,282,075 B2 | 10/2007 | Sporre et al. |
| 7,531,145 B2 * | 5/2009 | Aoki ............................ 422/180 |
| 7,569,090 B2 | 8/2009 | Nelson |
| 7,615,091 B2 | 11/2009 | Gieseke et al. |
| 7,753,982 B2 | 7/2010 | Merritt |
| 7,967,888 B2 | 6/2011 | Felder |
| 7,981,183 B2 | 7/2011 | Nepsund et al. |
| 8,002,869 B2 | 8/2011 | Nepsund et al. |
| 8,034,145 B2 | 10/2011 | Boehrs et al. |
| 8,062,399 B2 | 11/2011 | Nelson et al. |
| 8,152,888 B2 | 4/2012 | Nelson |
| 2003/0121845 A1 | 7/2003 | Wagner et al. |
| 2003/0185726 A1 * | 10/2003 | Jobson et al. ................. 422/180 |
| 2004/0093858 A1 * | 5/2004 | Aoki ............................... 60/299 |
| 2004/0187689 A1 | 9/2004 | Sporre et al. |
| 2005/0022484 A1 | 2/2005 | Krisko et al. |
| 2005/0229561 A1 | 10/2005 | Nepsund et al. |
| 2005/0252182 A1 | 11/2005 | Golden et al. |
| 2005/0284117 A1 | 12/2005 | Swars |
| 2006/0042210 A1 | 3/2006 | Dallas et al. |
| 2006/0163150 A1 | 7/2006 | Golden et al. |
| 2007/0289265 A1 | 12/2007 | Coulonvaux et al. |
| 2008/0060329 A1 | 3/2008 | Brown et al. |
| 2008/0135470 A1 * | 6/2008 | Merritt et al. ............. 210/493.4 |
| 2009/0211214 A1 | 8/2009 | Felder et al. |
| 2010/0044297 A1 * | 2/2010 | Krogue et al. .............. 210/283 |
| 2010/0146919 A1 | 6/2010 | Nelson et al. |
| 2011/0042295 A1 * | 2/2011 | Merritt .......................... 210/236 |

* cited by examiner

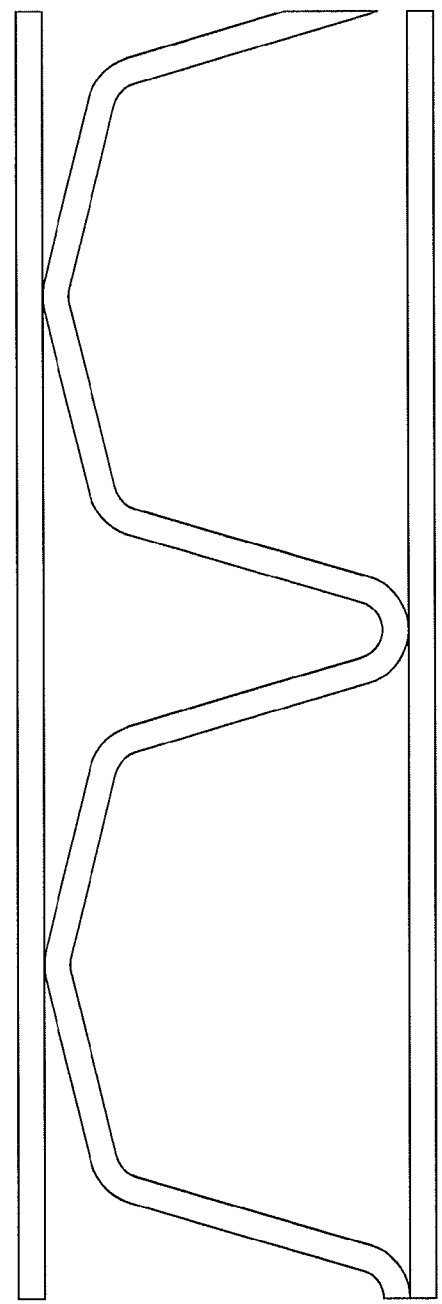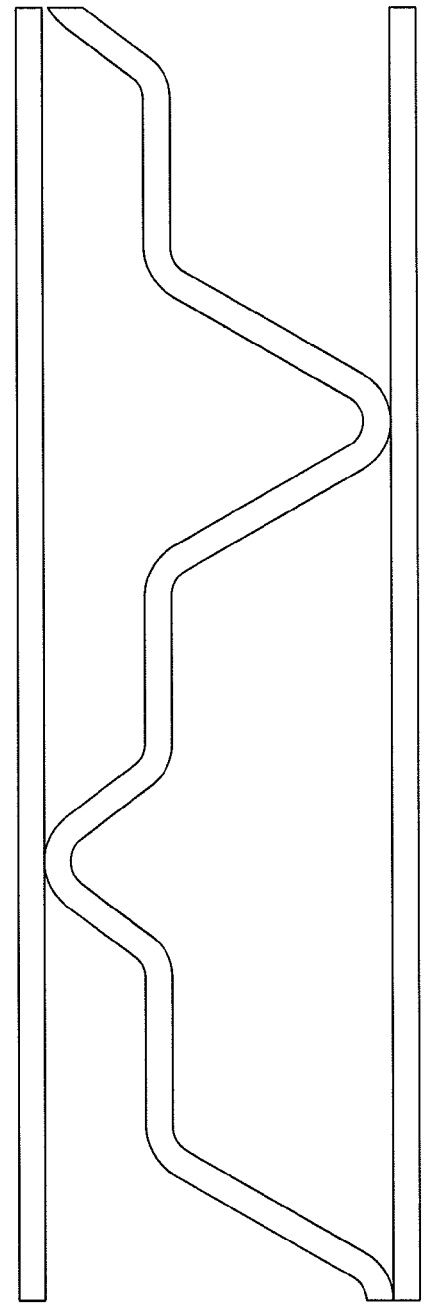
FIG. 3A
FIG. 3B

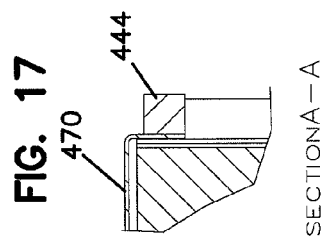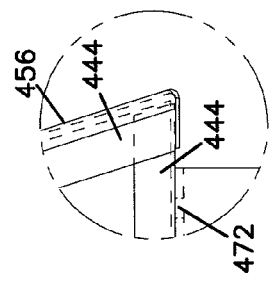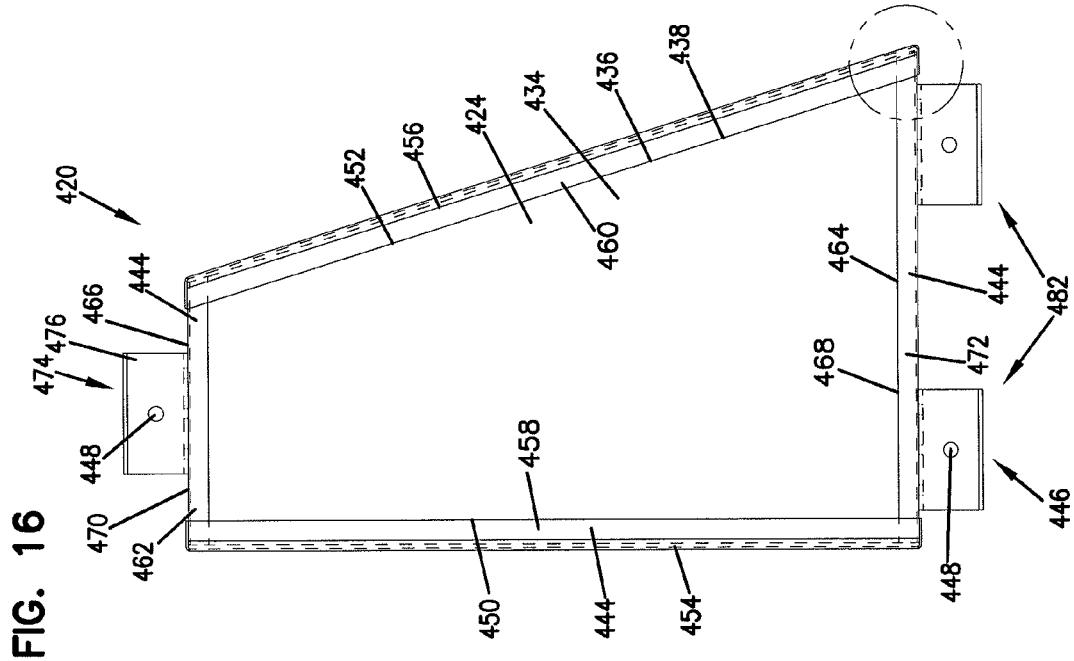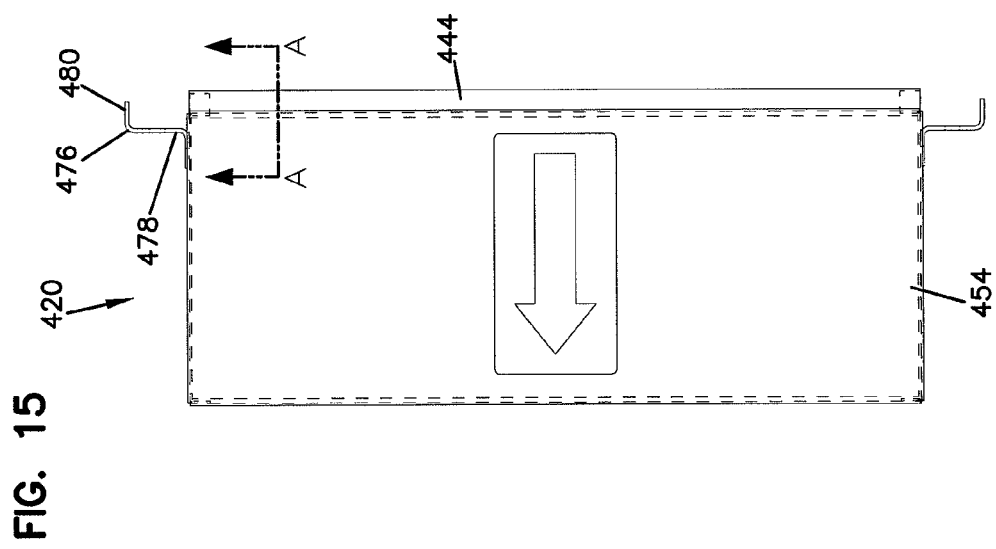

FILTER CARTRIDGE; COMPONENTS THEREOF; AND METHODS

CROSS REFERENCE TO RELATED APPLICATIONS

This application is a continuation of application Ser. No. 12/712,845, filed Feb. 25, 2010, which application claims priority under 35 U.S.C. §119(e) to U.S. provisional patent application Ser. No. 61/156,278, filed Feb. 27, 2009, which applications are incorporated herein by reference in their entirety.

FIELD OF THE DISCLOSURE

The present disclosure concerns filters for cleaning air, for example, for use in dust collectors and other equipment. In particular, this disclosure concerns z-filters for use in dust collectors and methods for cleaning them.

BACKGROUND

Dust collectors are used to clean particulate matter from airflow streams. One embodiment of dust collectors includes bag house filters. Bag house filters include: a housing, a dirty air inlet, a clean air outlet, and a tube sheet having a plurality of apertures. The tube sheet separates the housing between a dirty air side and a clean air side and holds filter bags. The bags are made of a filter media so that as dirty air flows from the dirty air side to the clean air side, the air must flow through the bags and the filter media of the bags prevents particulate matter from reaching the clean air side.

Improvements are desirable.

SUMMARY OF THE DISCLOSURE

Z-filters are described in reverse flow, reverse air, and reverse pulse systems that are capable of cleaning particulate matter from airflow streams.

It is noted that not all the specific features described herein need to be incorporated in an arrangement for the arrangement to have some selected advantage according to the present disclosure.

BRIEF DESCRIPTION OF THE DRAWINGS

FIG. 3A includes a schematic, fragmentary, cross-sectional view of a further fluted media configuration in a single facer media pack.

FIG. 3B includes a schematic, fragmentary, cross-sectional view of a still further alternate flute definition in a media pack comprising single facer strips.

FIG. 15 is a side elevational view of the filter cartridge of FIG. 13.

FIG. 16 is a bottom plan view of the filter cartridge of FIG. 13.

FIG. 17 is a cross sectional view of a portion of the filter cartridge of FIG. 13, the cross-section being taken along the line A-A of FIG. 15.

FIG. 18 is an enlarged view of a portion of the filter cartridge depicted in FIG. 16.

DETAILED DESCRIPTION

I. Z-Filter Media Configurations, Generally

Figure 1:
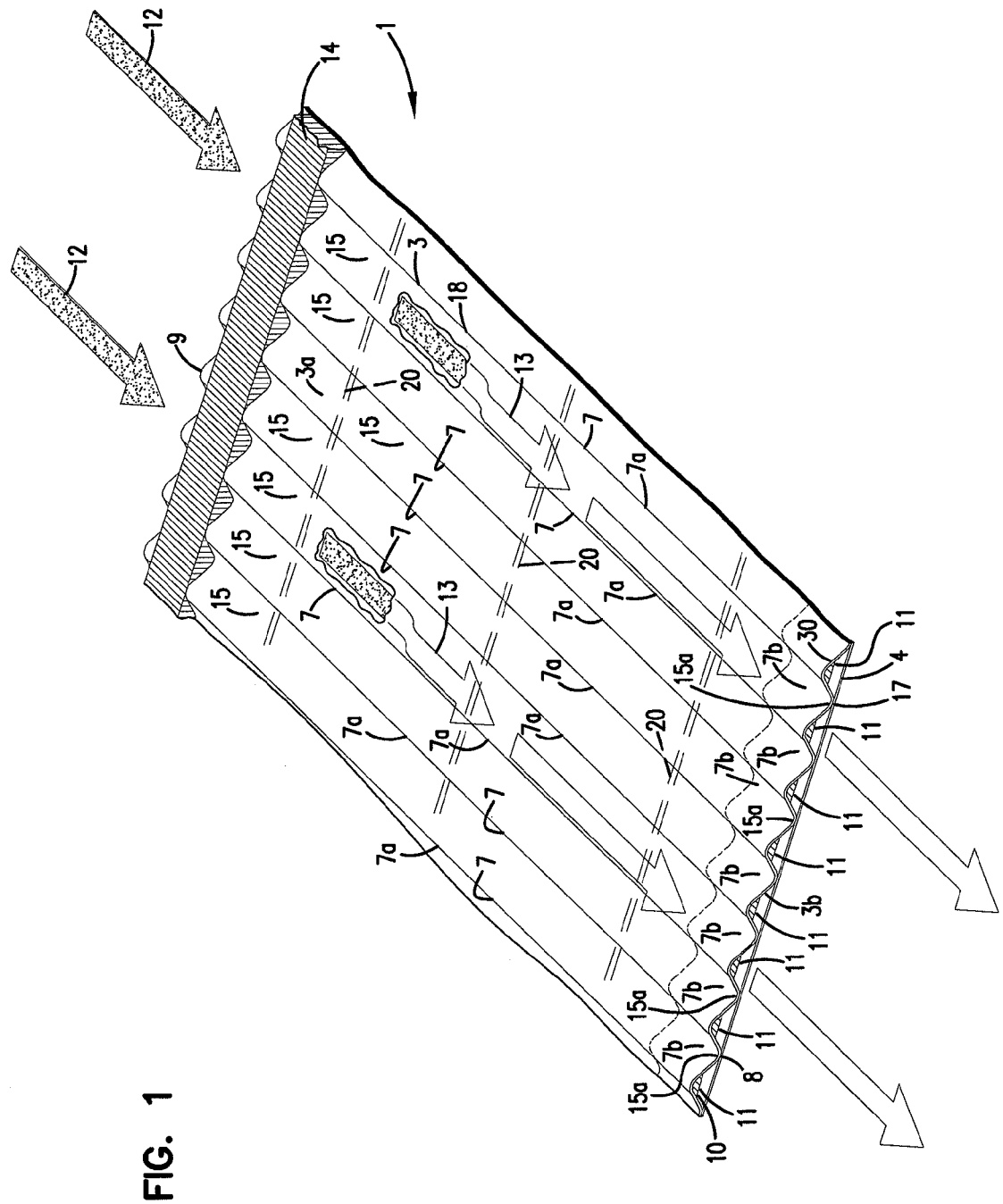
FIG. 1 is a fragmentary, schematic, perspective view of a single facer strip of z-filter media comprising a fluted sheet secured into a facing sheet.

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in commonly assigned published PCT application WO 05/077487, incorporated herein by reference.

The fluted (typically corrugated) media sheet and the facing media sheet, together, are used to define media having parallel inlet and outlet flutes; i.e. opposite sides of the fluted sheet operable as inlet and outlet flow regions. In some instances, the fluted sheet and non-fluted sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of fluted media secured to flat media, are stacked on one another, to create a filter construction. An example of this is shown herein at FIG. 7 and described in FIG. 11 of U.S. Pat. No. 5,820,646, incorporated herein by reference.

Typically, coiling of the fluted sheet/facing sheet combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, published Sep. 30, 2004 as WO 2004/082795, incorporated herein by reference. The resulting coiled arrangement generally has, as the outer surface of the media pack, a portion of the facing sheet, as a result. In some instances a protective covering can be provided around the media pack.

The term "corrugated" when used herein to refer to structure in media, is meant to refer to a flute structure resulting from passing the media between two corrugation rollers, i.e., into a nip or bite between two rollers, each of which has surface features appropriate to cause a corrugation affect in the resulting media. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. (The term "straight through flow configuration" disregards, for this definition, any air flow that passes out of the media pack through the outermost wrap of facing media.) The term "serviceable" in this context is meant to refer to a media containing filter cartridge that is periodically removed and replaced from a corresponding air cleaner. In some instances, each of the inlet flow end and outlet flow end will be generally flat or planar, with the two parallel to one another. However, variations from this, for example non-planar faces are possible.

In general, the media pack includes appropriate seal material therein, to ensure there is no unfiltered flow of air through the media pack, in extension from front flow face (an inlet flow face) completely through and outwardly from opposite oval face (outlet flow face).

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to inhibit air flow from one flow face to another without filtering passage through the filter media; and/or, such a media coiled or otherwise constructed or formed into a three dimensional network of flutes; and/or, a filter construction including such media. In many arrangements, the z-filter media construction is configured for the formation of a network of inlet and outlet flutes, inlet flutes being open at a region adjacent an inlet face and being closed at a region adjacent an outlet face; and, outlet flutes being closed adjacent an inlet face and being open adjacent an outlet face. However, alternative z-filter media arrangements are possible, see for example US 2006/0091084 A1, published May 4, 2006, incorporated herein by reference; also comprising flutes extending between opposite flow faces, with a seal arrangement to prevent flow of unfiltered air through the media pack.

In FIG. 1 herein, an example of media 1 useable in z-filter media is shown. The media 1 is formed from a fluted (corrugated) sheet 3 and a facing sheet 4. Herein, a strip of media comprising fluted sheet secured to facing sheet will sometimes be referred to as a single facer strip, or by similar terms.

In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs $7b$ and peaks $7a$.

The term "regular" in this context is meant to refer to the fact that the pairs of troughs and peaks (7b, 7a) alternate with generally the same repeating corrugation (or flute) shape and size. (Also, typically in a regular configuration each trough 7b is substantially an inverse of each peak 7a.) The term "regular" is thus meant to indicate that the corrugation (or flute) pattern comprises troughs and peaks with each pair (comprising an adjacent trough and peak) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction; an equal number of peaks and troughs are necessarily present. The media 1 could be terminated, for example, between a pair comprising a peak and a trough, or partially along a pair comprising a peak and a trough. (For example, in FIG. 1 the media 1 depicted in fragmentary has eight complete peaks 7a and seven complete troughs 7b.) Also, the opposite flute ends (ends of the troughs and peaks) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each peak and the bottom 7b of each trough is formed along a radiused curve. Although alternatives are possible, a typical radius for such z-filter media would be at least 0.25 mm and typically would be not more than 3 mm. (Media that is not curved, by the above definition, can also be useable.)

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and peak 7a is a convex region. Of course when viewed toward front side or face 3b, trough 7b of side 3a forms a peak; and, peak 7a of face 3a, forms a trough. (In some instances, region 30 can be a straight segment, instead of a point, with curvature inverting at ends of the segment 30.)

A characteristic of the particular regular, curved, wave pattern corrugated sheet 3 shown in FIG. 1, is that the individual corrugations are generally straight. By "straight" in this context, it is meant that through at least 70% (typically at least 80%) of the length between edges 8 and 9, the peaks 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is coiled and formed into a media pack, in general edge 9 will form an inlet end for the media pack and edge 8 an outlet end, although an opposite orientation is possible.

In the example shown, adjacent edge 8 is provided sealant, in this instance in the form of a sealant bead 10, sealing the corrugated (fluted) sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

In the example shown, adjacent edge 9, is provided sealant, in this instance in the form of a seal bead 14. Seal bead 14 generally closes flutes 15 to passage of unfiltered fluid therein, adjacent edge 9. Bead 14 would typically be applied as the media 1 is coiled about itself, with the corrugated sheet 3 directed to the inside. Thus, bead 14 will form a seal between a back side 17 of facing sheet 4, and side 18 of the corrugated sheet 3. The bead 14 will sometimes be referred to as a "winding bead" since it is typically applied, as the strip 1 is coiled into a coiled media pack. If the media 1 is cut in strips and stacked, instead of coiled, bead 14 would be a "stacking bead."

Referring to FIG. 1, once the media 1 is incorporated into a media pack, for example by coiling or stacking, it can be operated as follows. First, air in the direction of arrows 12, would enter open flutes 11 adjacent edge 9. Due to the closure at edge 8, by bead 10, the air would pass through the media shown by arrows 13. It could then exit the media pack, by passage through open ends 15a of the flutes 15, adjacent edge 8 of the media pack. Of course operation could be conducted with air flow in the opposite direction.

In more general terms, z-filter media comprises fluted filter media secured to facing filter media, and configured in a media pack of flutes extending between first and second opposite flow faces. A sealant arrangement is provided within the media pack, to ensure that air entering flutes at a first upstream edge cannot exit the media pack from a downstream edge, without filtering passage through the media.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation (flute) shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet. The media may also contain a resin.

The media of the corrugated sheet 3 facing sheet 4 or both, can be provided with a fine fiber material on one or both sides thereof, for example in accord with U.S. Pat. No. 6,673,136, incorporated herein by reference.

An issue with respect to z-filter constructions relates to closing of the individual flute ends. Typically a sealant or adhesive is provided, to accomplish the closure. As is apparent from the discussion above, in typical z-filter media especially those which use straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Still referring to FIG. 1, at 20 tack beads are shown positioned between the corrugated sheet 3 and facing sheet 4, securing the two together. The tack beads can be for example, discontinuous lines of adhesive. The tack beads can also be points in which the media sheets are welded together.

From the above, it will be apparent that the corrugated sheet 3 is typically not secured continuously to the facing sheet, along the troughs or ridges where the two adjoin. Thus, air can flow between adjacent inlet flutes, and alternately between the adjacent outlet flutes, without passage through the media. However air which has entered in inlet flute cannot exit from an outlet flute, without passing through at least one sheet of media, with filtering.

Figure 2:
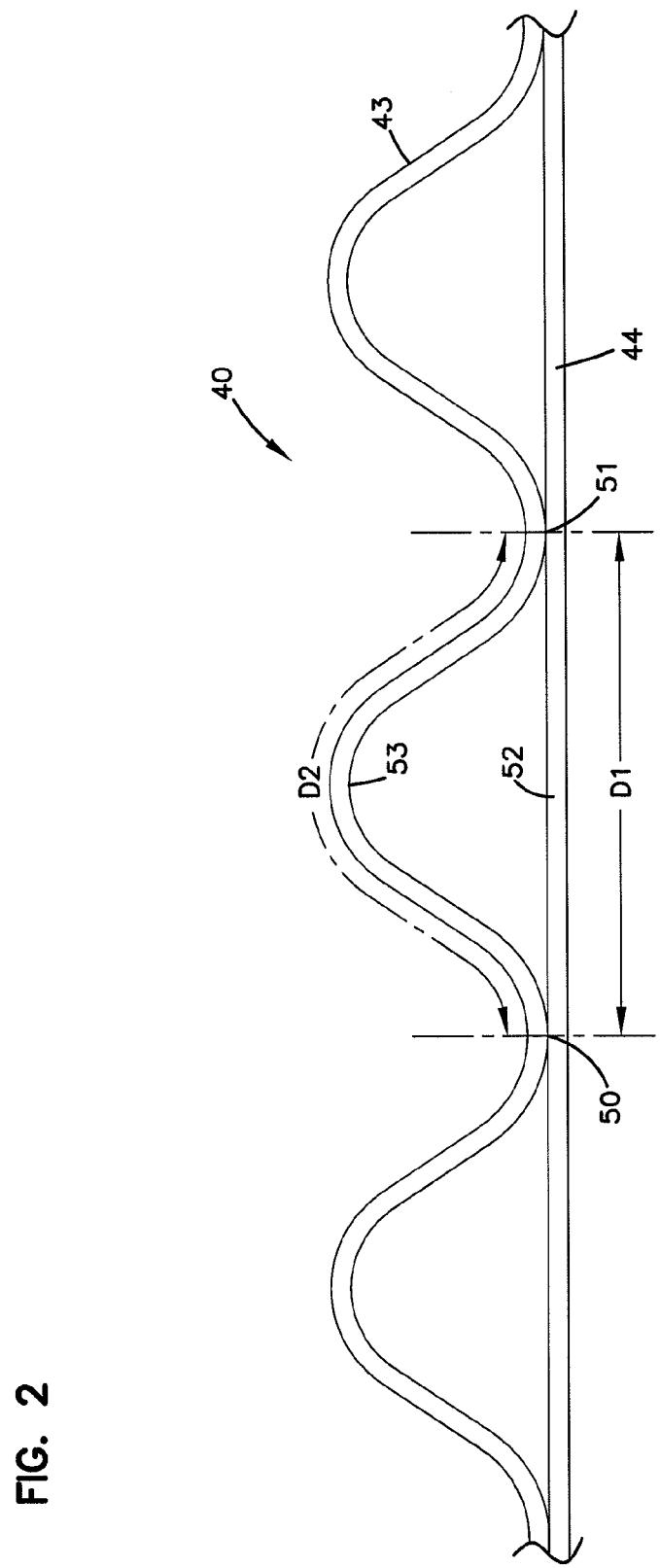
FIG. 2 is an enlarged, schematic, fragmentary view of a single facer sheet comprising fluted media secured to facing media.

Attention is now directed to FIG. 2, in which a z-filter media construction 40 utilizing a fluted (in this instance regular, curved, wave pattern corrugated) sheet 43, and a non-corrugated flat, facing, sheet 44, is depicted. The distance D1, between points 50 and 51, defines the extension of flat media 44 in region 52 underneath a given corrugated flute 53. The length D2 of the arch-shaped media for the corrugated flute 53, over the same distance D1 is of course larger than D1, due to the shape of the corrugated flute 53. For a typical regular shaped media used in fluted filter applications, the linear length D2 of the media 53 between points 50 and 51 will generally be at least 1.2 times D1. Typically, D2 would be within a range of 1.2-2.0, inclusive. One particularly convenient arrangement for air filters has a configuration in which D2 is about 1.25-1.35×D1. Such media has, for example, been used commercially in Donaldson Powercore™ Z-filter arrangements. Herein the ratio D2/D1 will sometimes be characterized as the flute/flat ratio or media draw for the corrugated media.

In the corrugated cardboard industry, various standard flutes have been defined. For example the standard E flute, standard X flute, standard B flute, standard C flute and standard A flute. Of course other, standard, flutes definitions from the corrugated box industry are known.

It is noted that alternative flute definitions such as those characterized in US 2008/068394 filed Jun. 26, 2007 and US 2009/051670 filed Jul. 24, 2009, can be used with air cleaner features as characterized herein below. The complete disclosures of each of US 2008/068394 and US 2009/05167 are incorporated herein by reference.

Figure 3C:
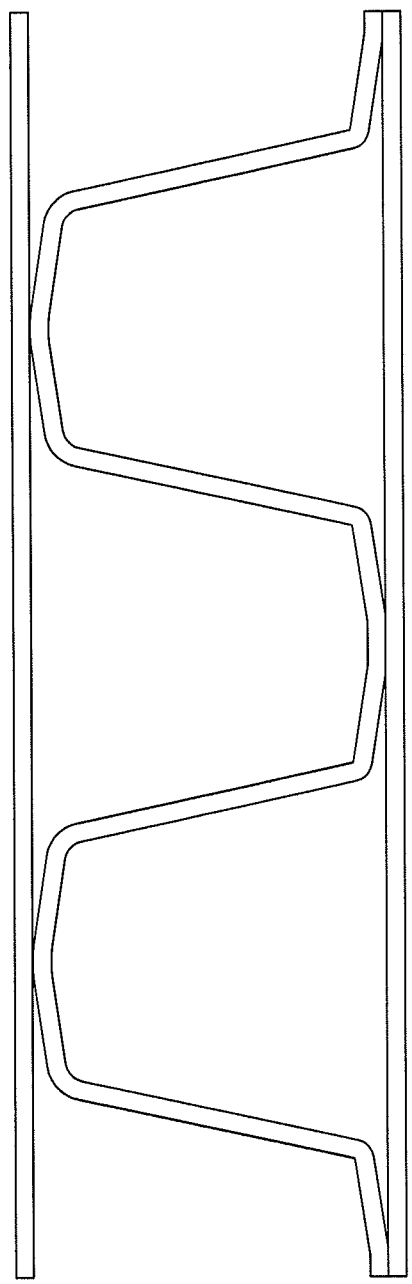
FIG. 3C includes a schematic, fragmentary, cross-sectional view of yet another flute definition in a media pack comprising single facer strips.

In FIGS. 3A-3C, cross-sectional views of exemplary portions of filtration media are shown wherein the fluted sheet has one or more non-peak ridge extending along at least a portion of the flute length. FIG. 3A shows a fluted sheet having one non-peak ridge provided between adjacent peaks, and FIGS. 3B and 3C show fluted sheets having two non-peak ridges between adjacent peaks. The non-peak ridges can extend along the flute length any amount including, for example, an amount of 20% of the flute length to 100% of the flute length. In addition, the fluted sheet can be provided without non-peak ridges between all adjacent peaks, and can be provided with differing numbers of non-peak ridges between adjacent peaks (e.g., alternating zero, one, or two non-peak ridges in any arrangement). The presence of non-peak ridges can help provide more media available for filtration in a given volume, and can help reduce stress on the fluted sheet thereby allowing for a smaller radius at the peaks and therefore reduced media masking. Such media can be used in arrangements according to the present disclosure.

II. Manufacture of Coiled Media Configurations Using Fluted Media, Generally

Figure 4:
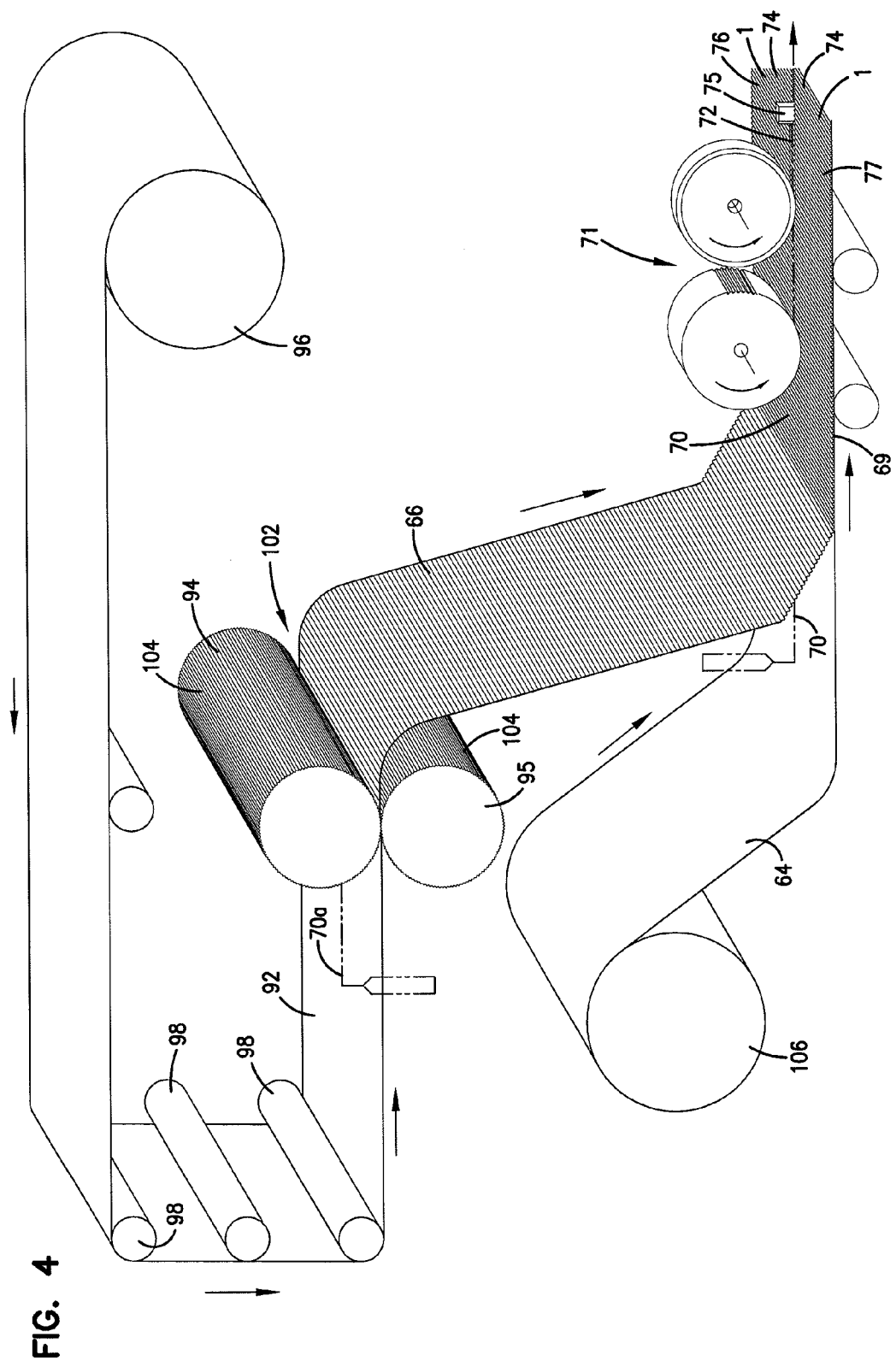
FIG. 4 is a schematic view of a process for making single facer media according to the present disclosure.

In FIG. 4, one example of a manufacturing process for making a media strip (single facer) corresponding to strip 1, FIG. 1 is shown. In general, facing sheet 64 and the fluted (corrugated) sheet 66 having flutes are brought together to form a media web 69, with an adhesive bead located therebetween at 70. The adhesive bead 70 will form a single facer bead 10, FIG. 1. An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 and eventually slit at 75, it must be formed. In the schematic shown in FIG. 4, this is done by passing a sheet of media 92 through a pair of corrugation rollers 94, 95. In the schematic shown in FIG. 4, the sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the sheet 92 becomes corrugated across the machine direction and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 would typically be secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

Of course the equipment of FIG. 4 can be modified to provide for the tack beads 20, if desired.

The type of corrugation provided to the corrugated media is a matter of choice, and will be dictated by the corrugation or corrugation teeth of the corrugation rollers 94, 95. One useful corrugation pattern will be a regular curved wave pattern corrugation, of straight flutes, as defined herein above. A typical regular curved wave pattern used, would be one in which the distance D2, as defined above, in a corrugated pattern is at least 1.2 times the distance D1 as defined above. In example applications, typically D2=1.25-1.35×D1, although alternatives are possible. In some instances the techniques may be applied with curved wave patterns that are not "regular," including, for example, ones that do not use straight flutes. Also, variations from the curved wave patterns shown, are possible.

Figure 5:
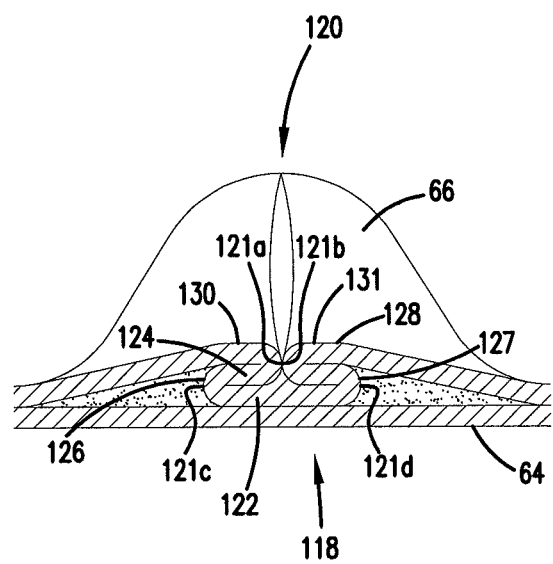
FIG. 5 is schematic, cross-sectional view of an example darted flute.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 118, when the fold 118 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 118, when viewed from the orientation of FIG. 5. That is, they are not meant to be otherwise indicative of direction when the fold 118 is oriented in an actual product for use.

Based upon these characterizations and review of FIG. 5, it can be seen that a regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Techniques for coiling the media, with application of the winding bead, are described in PCT application US 04/07927, filed Mar. 17, 2004 and incorporated herein by reference.

Alternate approaches to darting the fluted ends closed are possible. Such approaches can involve, for example, darting which is not centered in each flute, and rolling or folding over the various flutes. In general, darting involves folding or otherwise manipulating media adjacent to fluted end, to accomplish a compressed, closed, state.

Techniques described herein are particularly well adapted for use in media packs that result from a step of coiling a single sheet comprising a corrugated sheet/facing sheet combination, i.e., a "single facer" strip.

Coiled media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media pack. Typical shapes are circular as described in PCT WO 04/007054 and PCT application US 04/07927. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054 and PCT application US 04/07927, each of which is incorporated herein by reference.

Another way of describing the peripheral or perimeter shape is by defining the perimeter resulting from taking a cross-section through the media pack in a direction orthogonal to the winding access of the coil.

Opposite flow ends or flow faces of the media pack can be provided with a variety of different definitions. In many arrangements, the ends are generally flat and perpendicular to one another. In other arrangements, the end faces include tapered, coiled, stepped portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

Figure 6:
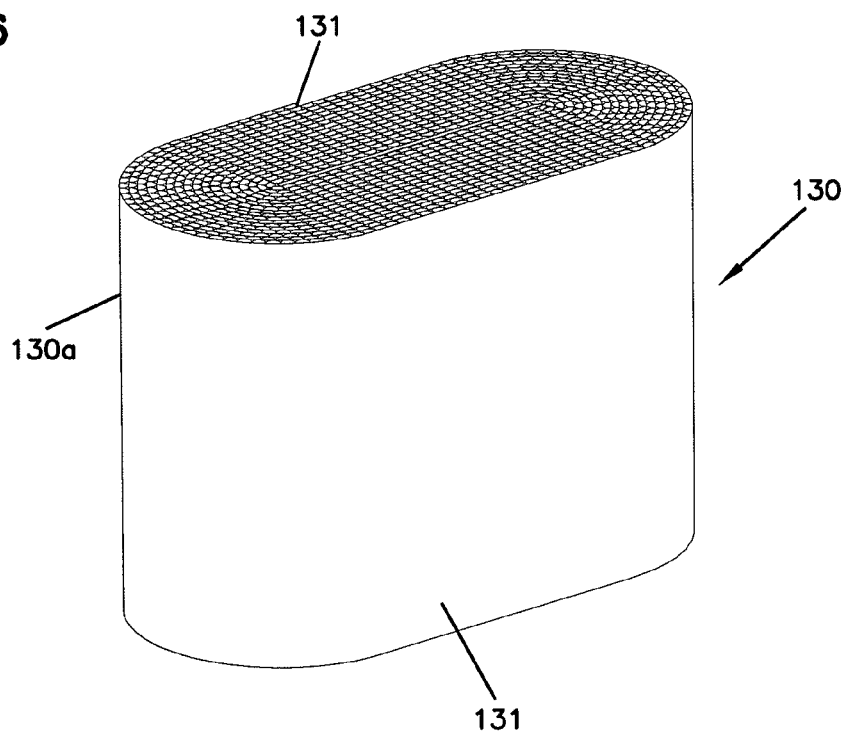
FIG. 6 is schematic, perspective view of a coiled media construction comprising a coiled sheet of single facer material.

Reference numeral 130, FIGS. 6, generally indicates a coiled media pack 130. The coiled media pack 130 comprises a single strip 130a of single facer material comprising a fluted sheet secured to facing sheet coiled around a center. Typically, the coiling is with facing sheeting directed outwardly. As previously described, in general a single facer bead and winding bead would be used, to provide flute seals within the media.

The particular coiled media pack 130 depicted comprises an oval media pack 131. It is noted that the principles described herein, however, can be applied starting with the media pack having a circular configuration.

Figure 7:
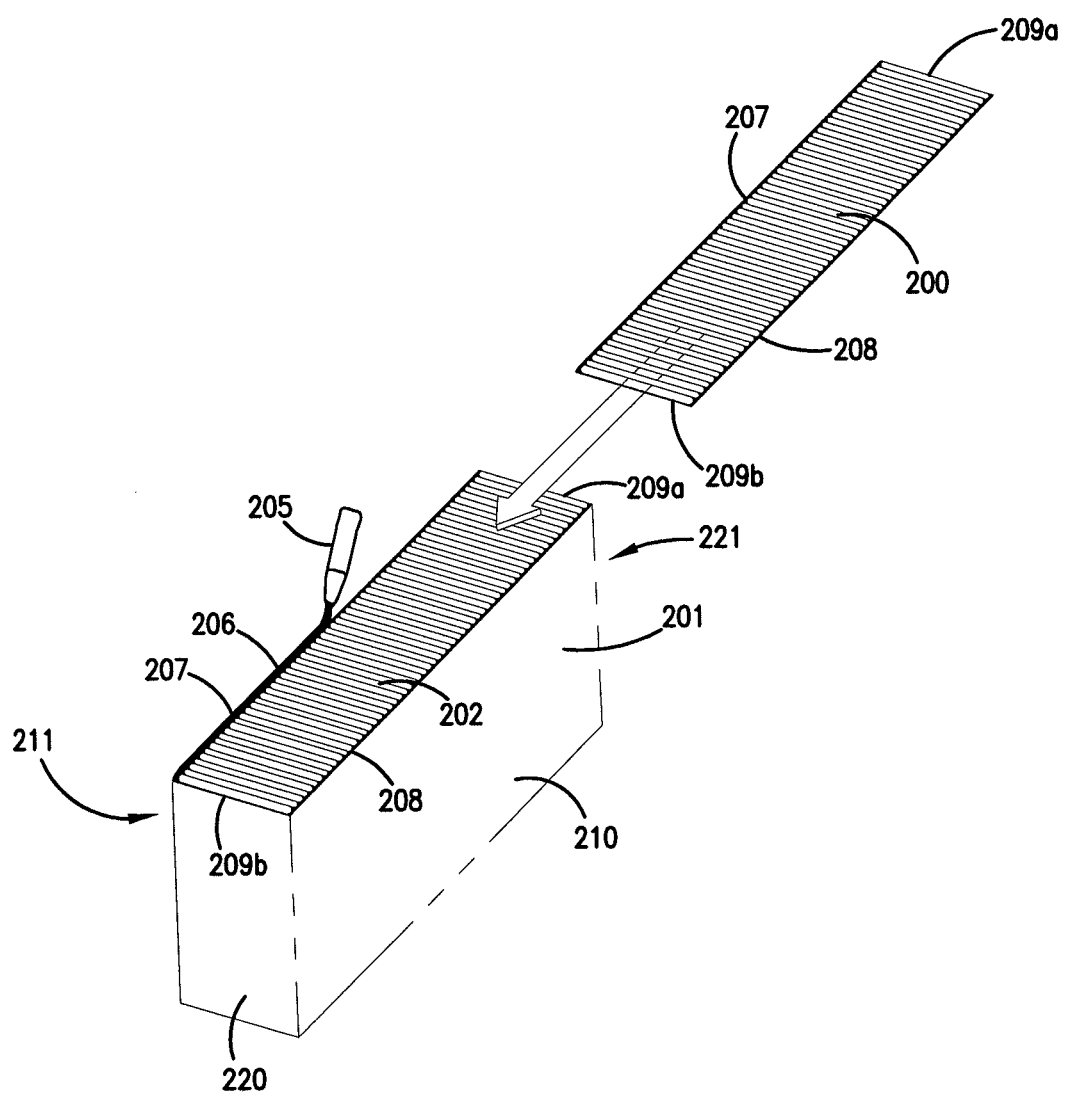
FIG. 7 is a schematic, perspective view of a stacked media construction.

In FIG. 7, schematically there is shown a step of forming a stacked z-filter media pack from strips of z-filter media, each strip being a fluted sheet secured to a facing sheet. Referring to FIG. 7, single facer strip 200 is being shown added to a stack 201 (which can be used to form a media pack) of strips 202 analogous to strip 200. Strip 200 can be cut from either of strips 76, 77, FIG. 4. At 205, FIG. 7, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 7, each strip 200, 202 has front and rear edges 207, 208 and opposite side edges 209a, 209b. Inlet and outlet flutes of the corrugated sheet/facing sheet combination comprising each strip 200, 202 generally extend between the front and rear edges 207, 208, and parallel to side edges 209a, 209b.

Still referring to FIG. 7, in the stack 201 for the media pack being formed, opposite flow faces are indicated at 210, 211. The selection of which one of faces 210, 211 is the inlet end face and which is the outlet end face, during filtering, is a matter of choice. In some instances the stacking bead 206 is positioned adjacent the upstream or inlet face 211; in others the opposite is true. The flow faces 210, 211, extend between opposite side faces 220, 221.

The stack 201 shown being formed into a media pack in FIG. 7, is sometimes referred to herein as a "blocked" stacked media pack. The term "blocked" in this context, is an indication that the arrangement is formed to a rectangular block in which all faces are 90° relative to all adjoining wall faces. Alternate configurations are possible, as discussed below in connection with certain of the remaining figures. For example, in some instances the stack can be created with each strip 200 being slightly offset from alignment with an adjacent strip, to create a parallelogram or slanted block shape, with the inlet face and outlet face parallel to one another, but not perpendicular to upper and bottom surfaces.

In some instances, the media pack will be referenced as having a parallelogram shape in any cross-section, meaning that any two opposite side faces extend generally parallel to one another.

It is noted that a blocked, stacked arrangement corresponding to FIG. 7 is described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003. All four of these latter references are incorporated herein by reference. It is noted that a stacked arrangement shown in U.S. Ser. No. 10/731,504, is a slanted stacked arrangement.

III. Dust Collector Systems, FIGS. 8-12

Figure 8:
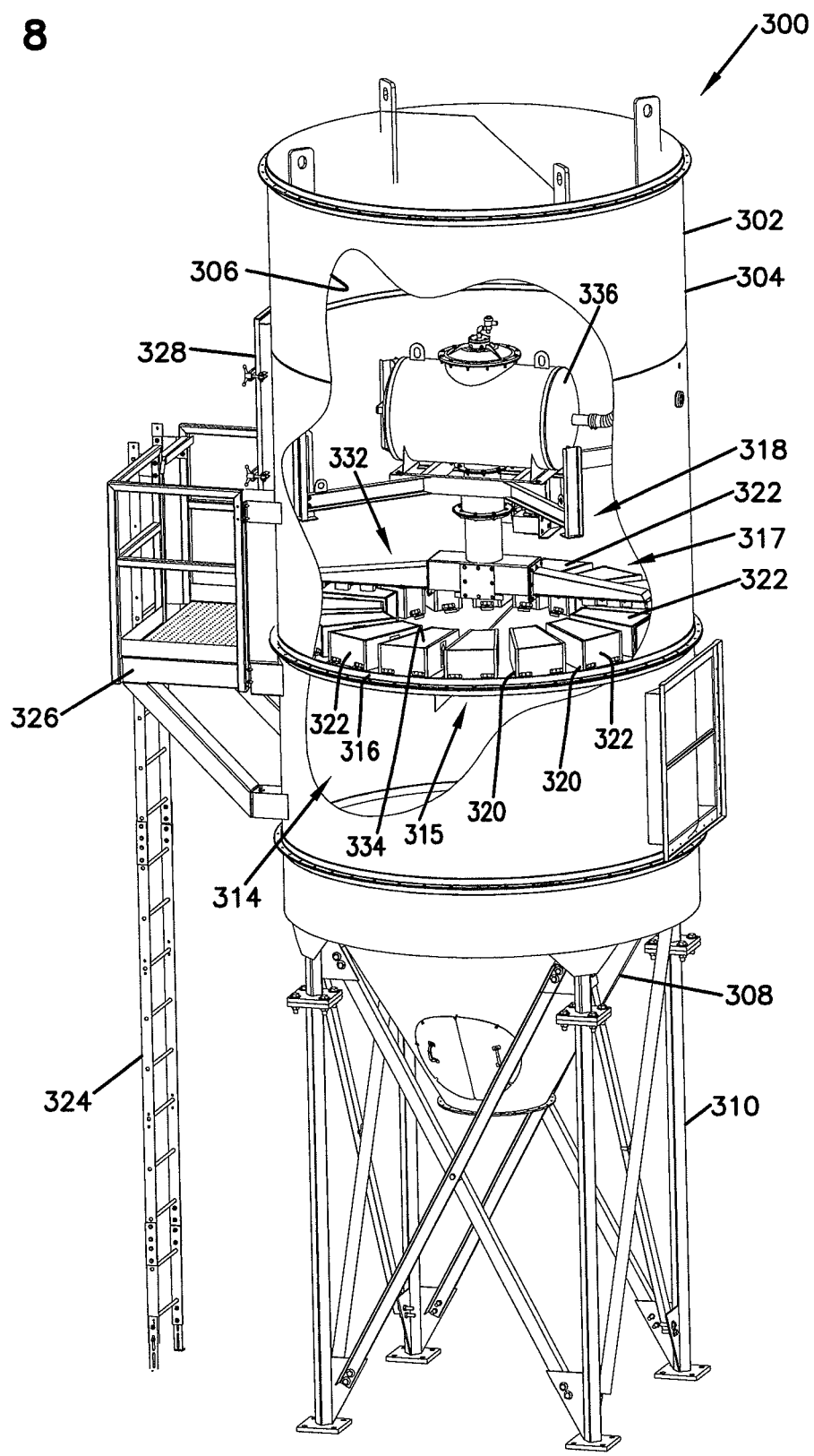
FIG. 8 is a schematic, perspective view of a first embodiment of a dust collector utilizing a rotating reverse pulse system and a filter cartridge having z-filter media.

In reference now to FIGS. 8-12, a first embodiment of a dust collector constructed in accordance with principles of this disclosure is shown in FIG. 8 at reference numeral 300. In the embodiment shown in FIG. 8, the dust collector 300 includes a housing 302. Housing 302 includes a wall 304, generally cylindrical in this embodiment, surrounding an interior volume 306. Oriented in communication with the interior volume 306 and below the housing 302 is a dust collection hopper 308. The hopper 308 is frusto-conical in shape, in this embodiment. The hopper 308 collects dust and debris separated from the air.

As can also be seen in FIG. 8, the dust collector 300 includes support structure 310, such as legs or other support beams oriented to support the housing 302 and hopper 308. Typically, the housing 302 and hopper 308 are supported vertically above the ground such that a drum or some other container can be placed underneath the hopper 308 to empty the hopper 308 of dust and debris.

Figure 9:
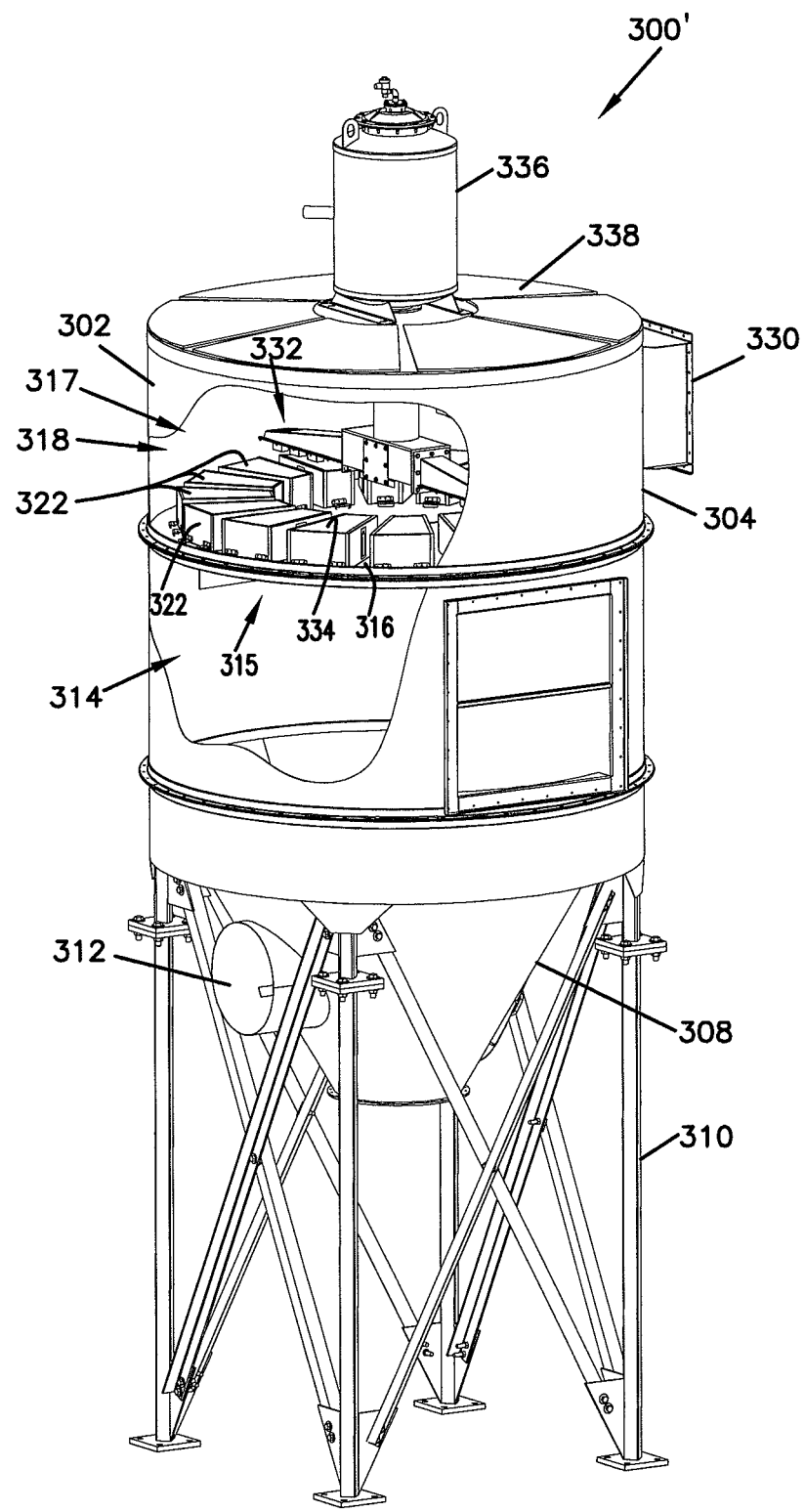
FIG. 9 is a schematic, perspective view of a similar dust collector as FIG. 8 utilizing filter cartridges of z-media and a rotating reverse pulse cleaning system.

The housing 302 defines a dirty air inlet, depicted schematically in this view at 312 (FIG. 9). The inlet 312 draws in unfiltered air into the housing 302, where it is then in the interior volume 306, and in particular, is in a dirty air volume 314.

The dust collector 300 further includes a tube sheet 316. The tube sheet 316 is within the interior volume 306 of the housing 302 and separates the interior volume 306 into a dirty air side 315 and a clean air side 317. The dirty air side 315 is part of the dirty air volume 314. The clean air side 317 is part of a clean air volume 318.

In this embodiment, the tube sheet 316 has a generally circular outer perimeter, which matches the cross sectional shape of the housing 302. The tube sheet 316 includes at least one aperture 320. In the embodiment shown, the tube sheet 316 includes a plurality of circumferentially spaced apertures 320. In the embodiment of FIG. 8, the apertures 320 are shown covered with filter cartridges 322.

To effectively fill the volume of the tube sheet 316 with filter cartridges 322, the apertures 320 are arranged, as mentioned above, circumferentially spaced from each other and generally wedge-shaped. The wedge-shape can be also described as being trapezoidal-shaped or a truncated sector-shaped. By "truncated sector", it is meant, generally, the sector of a circle with the pointed end cut off to form a flat side. By arranging the apertures 320 in this manner, filter media can be oriented within the housing 302 in an efficient and cost effective manner, while not having as much area occupied by tube sheet structure 316 as other prior art systems.

As can be seen in FIG. 8, the at least one filter cartridge 322 is mounted in the at least one aperture 320 in order to cover the aperture 320. In the system shown, the filter cartridge 322 is removably mounted in the tube sheet 316, such that after a period of use, the filter cartridge 322 can be removed and replaced with a new filter cartridge 322.

The dust collector 300 illustrates a ladder 324 for accessing the interior volume 306 of the housing 302. The ladder 324 extends to a platform 326. The person servicing the dust collector 300 can climb the ladder 324, stand on the platform 326, and then open a service door 328, which provides access to the interior volume 306. In this case, it provides access to the clean air volume 318.

As can be seen in FIG. 8, each of the filter cartridges 322 are oriented on the clean air side 317 within the clean air volume 318 of the housing 302. In this embodiment, no portion of the filter cartridges 322 protrude or extend into the dirty air side 315 within the dirty air volume 314; that is, the entire part of the filter cartridge 322 is within the clean air volume 318. Other embodiments could have the filter cartridges 322 or portions of the filter cartridges 322 within the dirty air volume 314. However, in the embodiment shown, the entire filter cartridge 322 is within the clean air volume 318, which is convenient when servicing the dust collector 300. Because of the location of the filter cartridge 322 within the clean air volume 318, the person servicing the dust collector 300 is subject to not as much dust and debris. Of course, it should be understood, and will be explained later, that one of the flow faces of the filter cartridge 322 is exposed to the dirty air volume 314. In this embodiment, the filter cartridges 322 are preferably flush with the tube sheet 316 and do not penetrate into the dirty air side 315.

The housing 302 further includes a clean air outlet, not shown in FIG. 8, but shown at 330 in FIG. 9.

The dust collector 300 further includes a blower arrangement, not shown, to direct air from the dirty air inlet 312 (FIG. 9) to the clean air outlet 330 (FIG. 9). The blower arrangement is typically located remotely from the dust collector 300, but is connected by duct work to the clean air outlet 330 in air flow communication.

The dust collector 300 further includes an arm arrangement 332. The arm arrangement 332 is movably mounted in the clean air side 317. It is oriented to move over the at least one filter cartridge 322 and to direct a jet of air through the downstream side 334 of the filter cartridge 322. What this does is back flushes the media in the filter cartridge 322, in order to remove at least some dust and debris from the upstream side of the media in the filter cartridge, which allows for the filter cartridge 322 to operate longer.

The arm arrangement 332 is operably connected in air flow communication to a compressed air tank 336. In the embodiment of FIG. 8, the tank 336 is within the clean air volume 318. In the embodiment of FIG. 9, the compressed air tank 336 is mounted outside of the housing 302, on a roof 338 of the housing 302. The compressed air tank 336 is connected to a remote compressor, for providing the jet of air that is sent through the arm arrangement 332. In the embodiment of FIG. 9, the dust collector is shown at reference numeral 300', and is the same as the dust collector 300 of FIG. 8, except that the compressor 336 is mounted on the roof 338.

Figure 23:
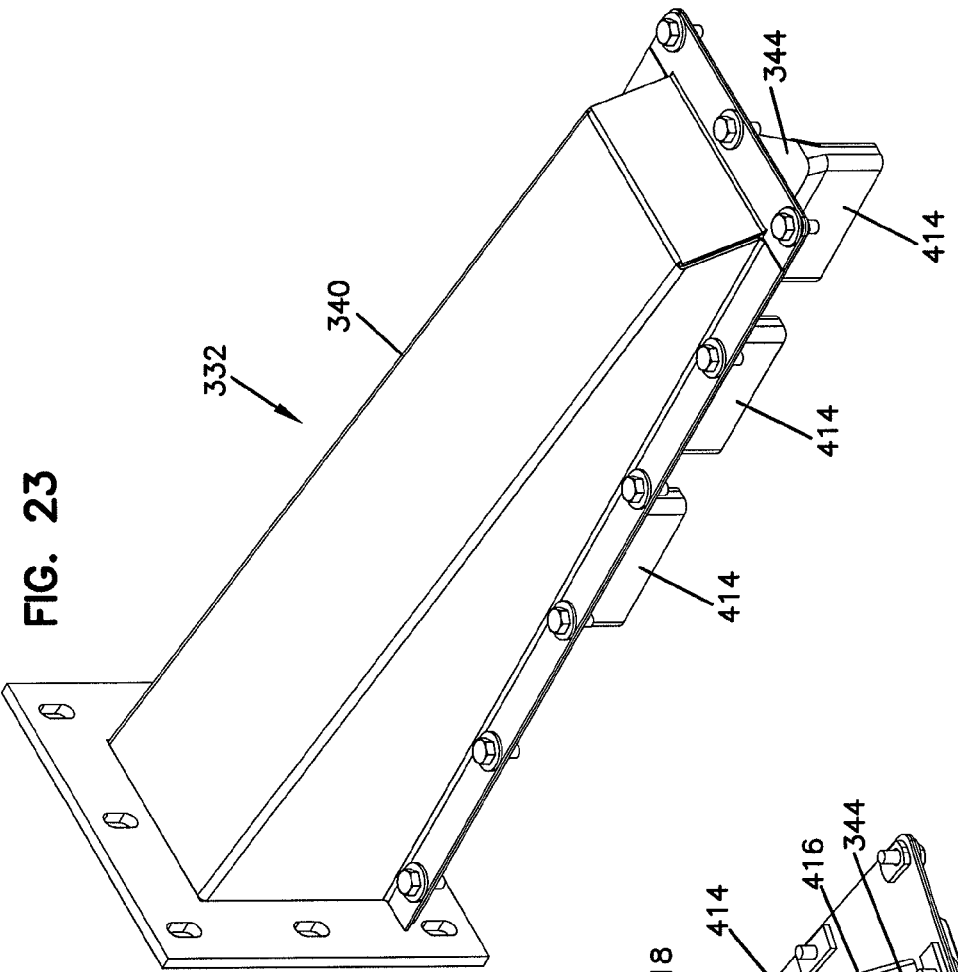
FIG. 23 is another perspective view of the arm of FIG. 22.
Figure 22:
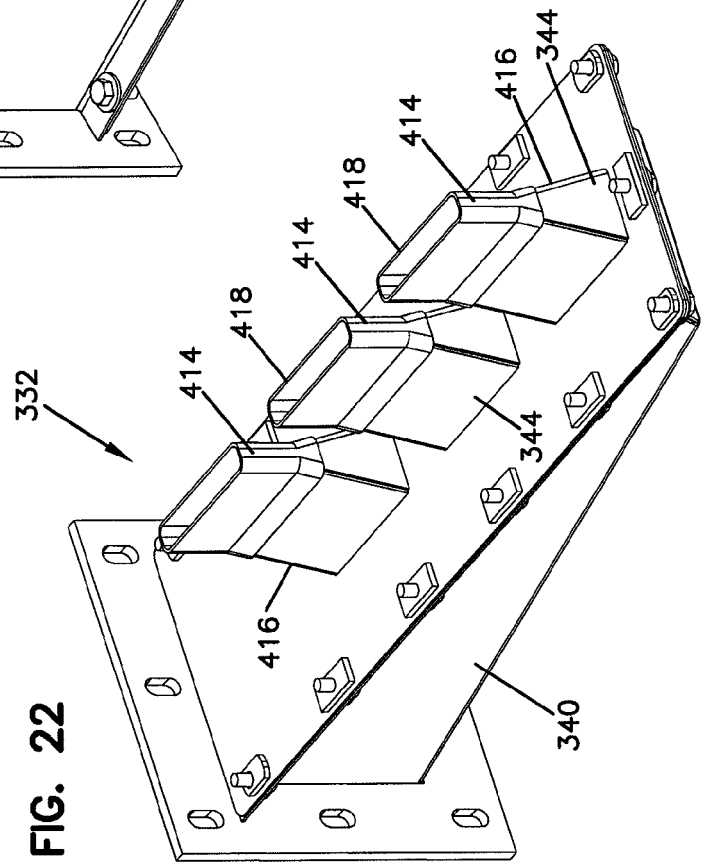
FIG. 22 is a perspective view of one embodiment of an arm having nozzles usable with the dust collectors of FIGS. 8-12 and 21.
Figure 26:
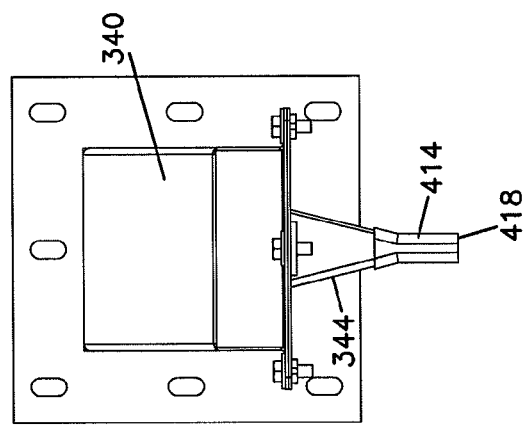
FIG. 26 is an end view of the arm of FIG. 24.
Figure 27:
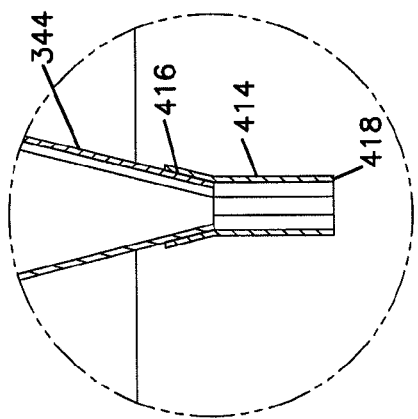
FIG. 27 is an enlarged view of the cross-section of the nozzle and sleeve depicted in FIG. 25.

FIGS. 22 and 23 to be discussed further below, illustrate an example embodiment of arm arrangement 332. The arm arrangement 332 includes an arm housing 340 defining a volume of an air distribution header 342 (FIG. 25) within the arm housing 340. Extending from the arm housing 340 and in air flow communication with the air distribution header is a plurality of nozzles 344. The nozzles 344 direct the jet of air from the compressor tank 336, through the air distribution header 342, through the nozzles 344, and to the downstream side 334 of the filter cartridges 322. The arm arrangement 332 is movably mounted, so that the nozzles move over each of the filter cartridges 322.

In the embodiment depicted in FIG. 8, the arm arrangement 332 rotates in a circle about a central axis, which, in this embodiment, aligns with a central axis of the tube sheet 316.

In operation, dirty air is drawn through the inlet 312 by way of the blower. The dirty air moves into the dirty air volume 314 on the dirty air side 315 of the tube sheet 316. The dirty air then passes through the filter cartridge 322, where dust and debris is removed from the air. The filtered air then flows into the clean air volume 318 on the clean air side 317 of the tube sheet 316. The clean air then exits the housing 302 through the outlet 330. The arm arrangement 332 directs a jet of air through the downstream flow face of at least one of the filter cartridges 322 in order to remove at least some of the dust and debris from the upstream side of the filter cartridge 322. The dust and debris falls by gravity into the hopper 308.

In the embodiment depicted in FIG. 8, the arm arrangement 332 is constructed and arranged to periodically direct a pulse of air at a pressure of about 3-15 psi. With periodic pulsing at this pressure range, which is a relatively low pressure version, the cleaning system is operating as a reverse pulse cleaning system. Periodically, the compressed air tank 336 containing a valve assembly will operate to fire or emit a pulse of air at this relatively low pressure range of 3-15 psi. The pressure pulse will be emitted through the nozzles 344 and at the downstream side 334 of the filter cartridge 322. This pulse of air will then flow through the filter media and help to push any dirt of debris built up on the upstream side of the filter cartridge 322.

In another embodiment, the arm arrangement 332 operates at higher pressures, such as greater than 15 psi. In those arrangements, the arm arrangement 332 is operably connected to the compressed air tank 336 and is constructed and arranged to periodically direct a pulse of air at a pressure of greater than 15 psi at the downstream side 334 of the filter cartridges 322.

Figure 10:
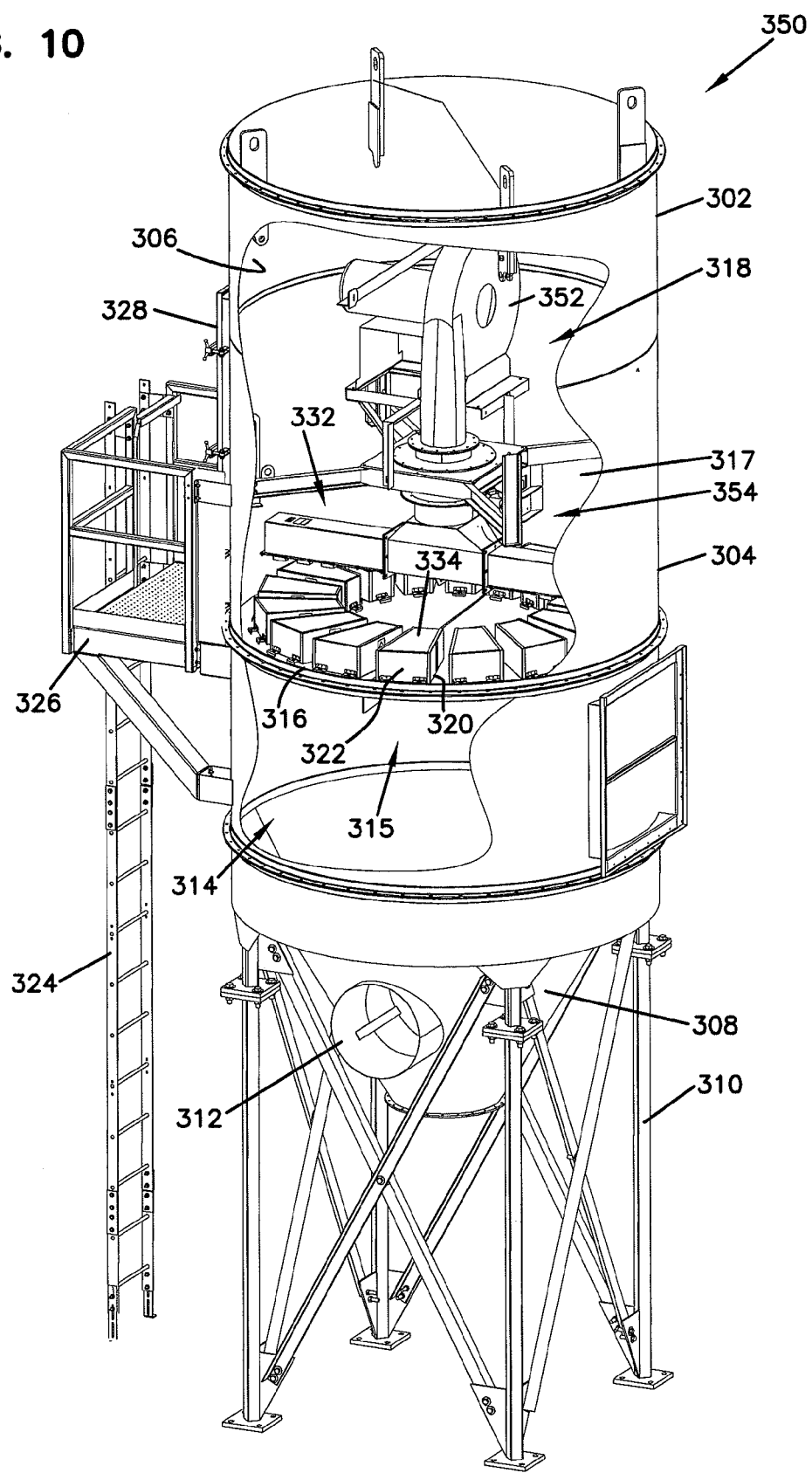
FIG. 10 is a schematic, perspective view of another embodiment of a dust collector utilizing filter cartridges of z-media and having a reverse flow cleaning system.

The embodiment of FIG. 10 illustrates another embodiment of a dust collector 350. The dust collector 350 includes the same structure as described above with respect to the dust collector 300, and as such, will carry the same reference numerals for these same parts. In this embodiment, however, the arm arrangement 332 is operably connected to a blower 352 and is constructed and arranged to constantly direct a stream of air at the downstream side 334 of at least one filter cartridge 322. Such a cleaning system is referred to as a reverse flow cleaning system 354. In the reverse flow cleaning system 354, rather than directing a pulse of air, as in the embodiment of FIGS. 8 and 9, there is a constant stream of air that is directed from the nozzles 344 to at least one of the filter cartridges 322. The constant stream of air is generally very low pressure, such as a pressure of less than 3 psi.

Figure 11:
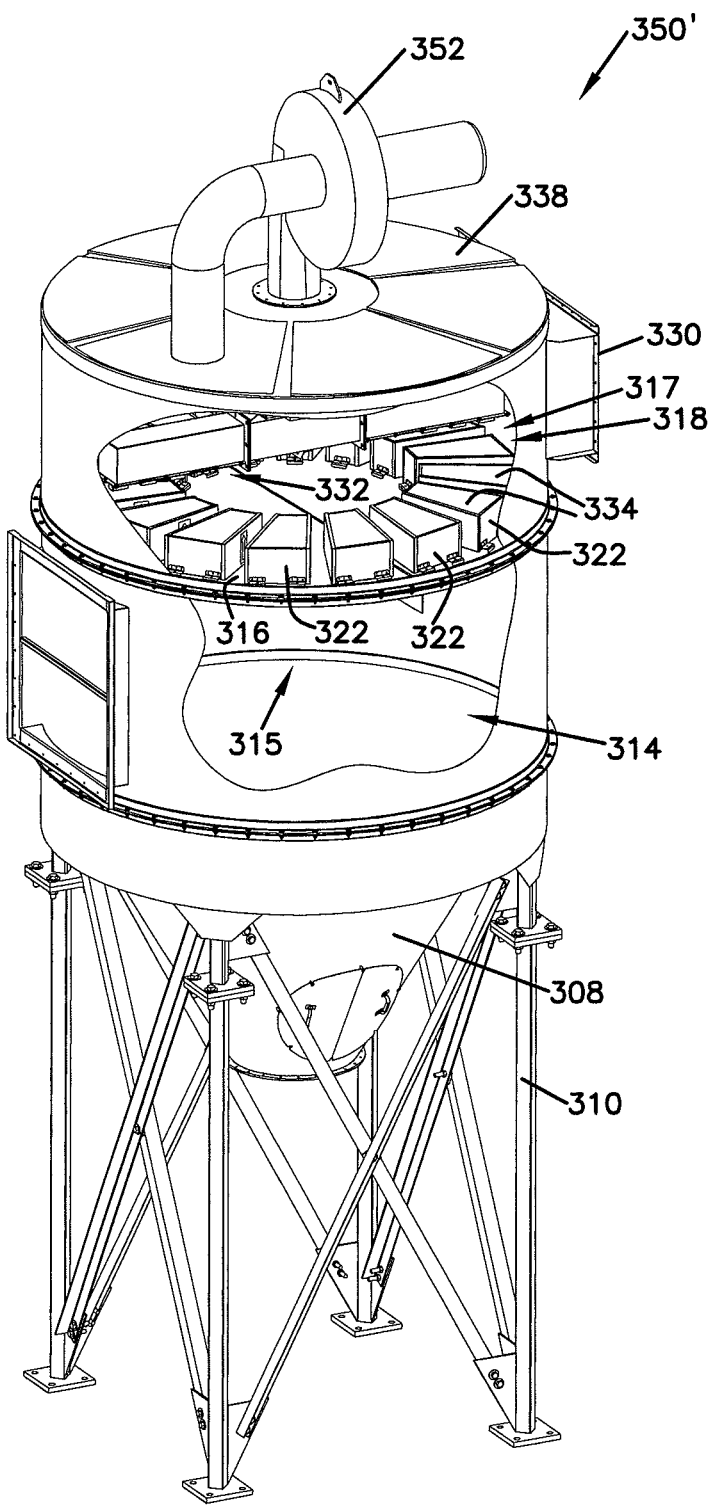
FIG. 11 is another perspective view of a dust collector similar to the dust collector of FIG. 10 utilizing filter cartridges of z-media and having a reverse flow cleaning system.

In the embodiment of FIG. 11, a dust collector is shown at 350'. This dust collector 350' is the same as the dust collector 350 of FIG. 10, except that the blower 352 has been moved to be outside of the interior volume 306 and onto the roof 338 of the housing 302.

Figure 12:
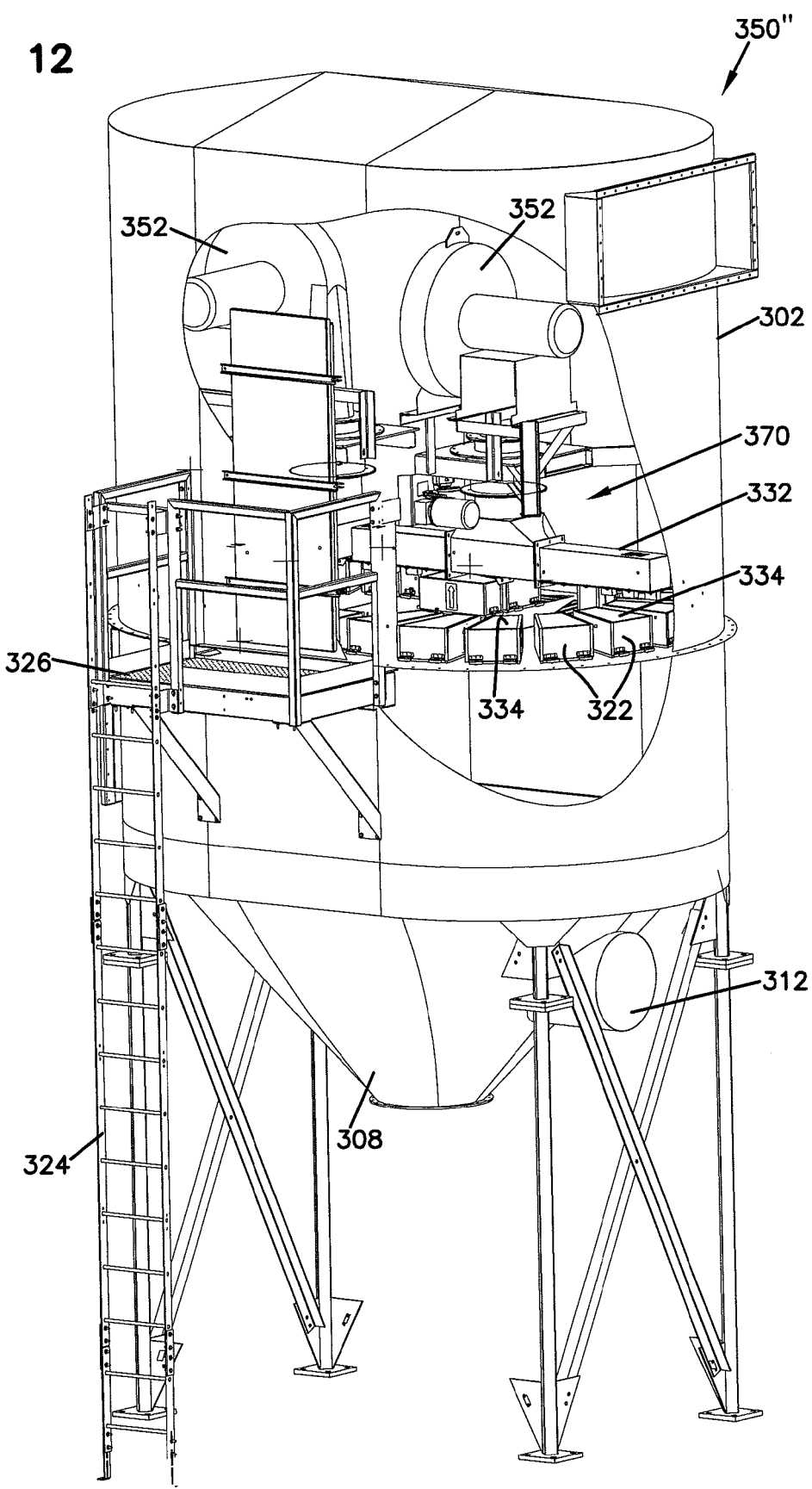
FIG. 12 is a schematic, perspective view of another embodiment of a dust collector; this dust collector also utilizing filter cartridges of z-media and having a double rotating reverse flow cleaning system.

In FIG. 12, a dust collector 350" is illustrated. The dust collector 350" is similar to the dust collector 350 shown in FIG. 10, and similar functioning parts carry the same reference numerals. In this embodiment, the dust collector 350" includes a double rotating reverse flow cleaning system 370. The double rotating reverse flow cleaning system 370 includes at least a pair of arm arrangements 332, with only one of the arm arrangements 332 being clearly visible in FIG. 12. The double rotating reverse flow cleaning system will allow for constantly directing a stream of air at a pressure of less than 3 psi at more than one filter cartridge 322 at a time. In this system, there are more filter cartridges 322 utilized than in the systems of FIGS. 8-11, and as such, it is convenient to have the double rotation reverse flow cleaning system 370. The system 370 includes the pair of arm arrangements 322, each rotating about an axis, in order to constantly direct a stream of air at a pressure of less than 3 psi at the downstream side 334 of at least one filter cartridge 322.

IV. Example Filter Cartridges, FIGS. 13-20

Published PCT application 2008/106375 is incorporated herein by reference. PCT 2008/106375 discloses trapezoidal shaped filter cartridges and methods for making them.

Figure 13:
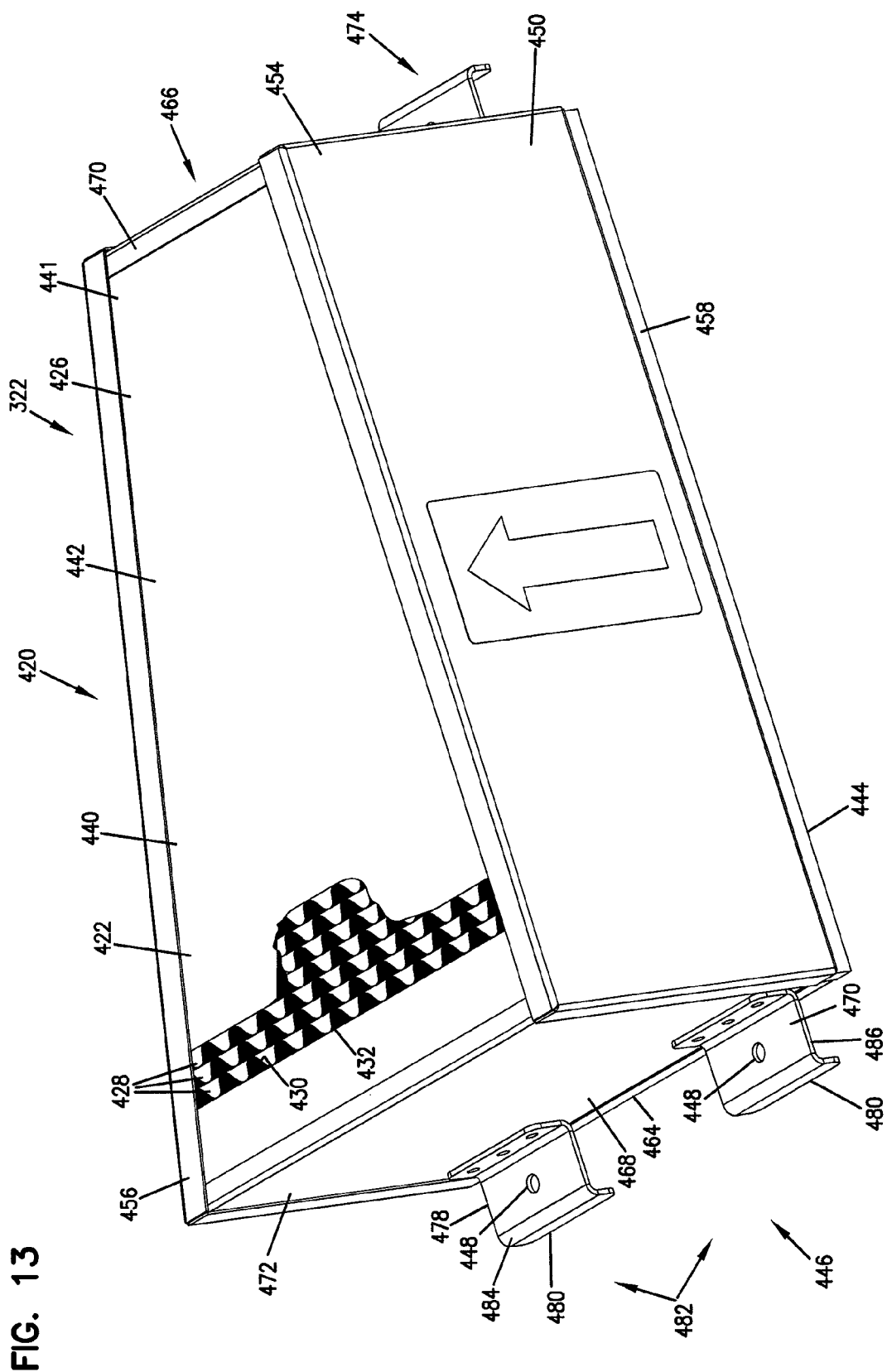
FIG. 13 is a perspective view of one embodiment of a filter cartridge utilizing z-media that can be used in any of the dust collectors of FIGS. 8-12.
Figure 14:
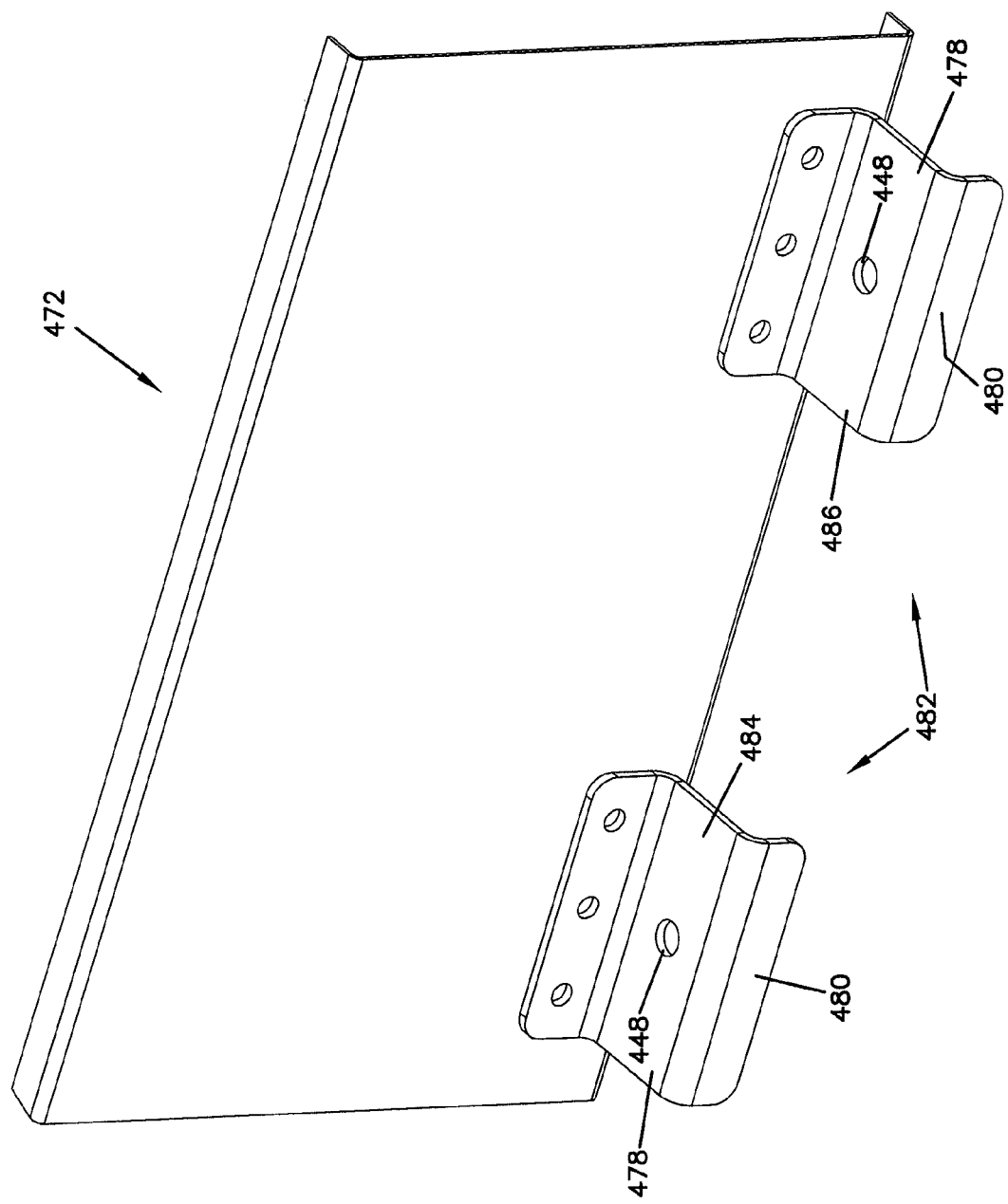
FIG. 14 is a perspective view of an end cap on the filter cartridge of FIG. 13.

In FIGS. 13-18, one embodiment of filter cartridge 322 that is usable in any of the dust collectors described herein is illustrated at 420. In the embodiment shown, the cartridge 420 includes a media pack 422 having a first flow face 424 (FIG. 16) and an opposite second flow face 426 (FIG. 13).

The media pack 422 includes a stack of strips 428 of single facer filter media material. Each strip 428 includes a fluted media sheet 430 secured to a facing media sheet 432 and oriented with flutes of each fluted sheet 430 extending in a direction between the first and second opposite flow faces 422, 426. The media pack 422, is generally as described in connection with FIG. 7 above.

The first flow face 424 (FIG. 16) comprises a planar inlet flow face 434 having a non-rectangular perimeter shape 436. The shape 436 is, preferably, non-circular. In the preferred embodiment shown, the shape 436 is a trapezoidal perimeter shape 438.

In the embodiment shown, the second flow face 426 (FIG. 13) is an outlet flow face 440. When the filter cartridge 420 is operably installed in one of the dust collectors as described herein, the outlet flow face 440 will correspond to the downstream side 334 of the filter cartridge 322. As can be seen in FIG. 13, in the preferred embodiment, the outlet flow face 440 also has a non-rectangular perimeter shape 441. In this embodiment, the shape 441 is also a trapezoid shape 442. Preferably, the trapezoid shape 442 is the same as the trapezoid shape 438.

Still in reference to FIG. 13, the air filter cartridge 420 depicted includes a gasket member or seal gasket 444 around the media pack 422. Example orientations for the gasket 444 are described further below. In general, the gasket 444 is for providing a seal against the tube sheet 316 so that air to be filtered does not bypass the filter cartridge 420; but rather, is forced to pass through the media pack 422.

Also visible in FIG. 13 is a mounting bracket arrangement 446. The mounting bracket arrangement 446 is for allowing the mounting of the filter cartridge 420 to the tube sheet 316. In the embodiment shown, the mounting bracket arrangement 446 is secured to the media pack 422 and defines at least one fastener socket 448 to allow mounting of the filter cartridge 420 to the tube sheet 316. This is described further below.

As mentioned above, each strip 428 of single facer filter media material has a facing media sheet 432. Preferably, this facing media sheet 432 is non-fluted. Preferably, it is a flat piece of material.

In FIG. 13, the media pack 422 illustrates only a portion of the media across the flow face 426. It should be understood that the entire planar surface within the perimeter shape 441 would be formed of the strips 428.

By reviewing FIGS. 13 and 16, it can be appreciated that in this embodiment, the media pack 422 includes a first side 450 and an opposite second side 452. The first and second sides 450, 452 extend between the first and second opposite flow faces 424, 426. In this embodiment, each of the first and second sides 450, 452 are at least partially secured and in this embodiment, fully secured to corresponding first and second side panels 454, 456.

A perimeter definition of the inlet flow face 434 (FIG. 16) includes first and second, opposite, non-parallel edges 458, 460 of different length. Also, the perimeter definition includes third and fourth, parallel edges 462, 464 of different lengths. As can be seen, the first edge 458 extends generally perpendicular to the third and fourth edges 462, 464.

The media pack 422 has, as described above, a first pair of opposite's side, which are first and second sides 450, 452. The media pack, 422, in this embodiment, also includes a second pair of opposite sides including third and fourth sides, 466, 468. The third and fourth sides 466, 468 extend between the first and second opposite flow faces 424, 426 and also between the first and second sides 450, 452. The third and fourth sides 466, 468 engage the first flow face 424 along the third and fourth edges 462, 464. The first and second sides 450, 452, engage the first flow face 424 along the first and second edges 458, 460. The first edge 458 has a different length than the second edge 460.

As can be seen in FIGS. 13 and 16, in this embodiment, the first side 450 extends in a plane that is non-parallel to the second side 452. The third edge 462 is shorter than the fourth edge 464, in this embodiment. In this embodiment, the third side 466 extends in a plane generally parallel to the fourth side 468.

Preferably, the third side 466 and fourth side 468 are at least partially secured to panels or respective first and second end caps 470, 472. The end cap 472 is illustrated in a perspective view in FIG. 14.

In the preferred embodiment, a ratio of the third edge 462 to the fourth edge 464 is about 0.5-0.6. In one example, a ratio of the third edge 462 to the first edge 458 is about 0.3-0.4. In one example, a ratio of the fourth edge 464 to the first edge 458 is about 0.6-0.8. In one example, an angle between the fourth edge 464 and the second edge 460 is about 70-75 degrees.

As mentioned above, the filter cartridge 420 includes a gasket 444. In the embodiment shown, the gasket member 444 is secured to an end of the side panels 454, 456 and the end caps 470, 472. As can be seen in FIG. 16, the gasket 444 projects from the end of these panels 454, 456 and end caps 470, 472 and projects beyond a plane of the first flow face 424. The gasket 444, in this embodiment, corresponds to the outer perimeter, and as such, forms a trapezoidal shape. The mounting bracket arrangement 446 helps to compress and squeeze the gasket 444 against the tube sheet 316 to form a seal. This is described below.

The mounting bracket arrangement 446, in this embodiment, includes at least a first flange arrangement 474 radially extending from the third side 466. In particular, the first flange arrangement 474 is secured to the first end cap 470 (FIG. 17) and includes an L-shaped flange 476. The flange 476 includes a socket 448 for receiving a fastener, such as a bolt. The L-shaped flange 476 includes a radially extending leg 478 (FIG. 15) and an axially extending foot 480. The foot 480 is oriented in a direction toward the first flow face 424, and it is radially spaced from the media pack 422 by the leg 478. The leg 478 defines the socket 448. The foot 480 prevents the gasket 444 from being over-compressed by the fastener, through the socket 448 and into the tube sheet 316. That is, the foot 480 operates as a stop to prevent the over tightening of the fastener. As can be seen in FIG. 15, the foot 480 does not extend past the gasket 444.

The mounting bracket arrangement 446 further includes at least a second flange arrangement 482.

The second flange arrangement 482 radially extends from the fourth side 468. In the particular embodiment shown, the second flange arrangement 482 extends radially from the second end cap 472, which is secured to the fourth side 468. In the embodiment shown, the second flange arrangement 482 includes a pair of linearly spaced flanges 484, 486. Each of the flanges 484, 486 defines a second socket 448 and a third socket 448 for receiving a fastener to allow connection of the filter cartridge 420 over the aperature 320 in the tube sheet 316. In the preferred embodiment, the flanges 484, 486 are constructed as described above for flange 476, including having a leg 478 and foot 480.

As can be seen in FIG. 16, overall, in this embodiment the mounting bracket arrangement 446 includes a plurality of flanges 476, 484, 486, with each of the flanges 476, 484, 486 being linearly spaced from each other and at least one of the flanges 476 being spaced radially from at least one other flange in the plurality. In this embodiment, the flange 476 is both linearly and radially spaced from both of the flanges 484, 486.

In use, the filter cartridge 420 is removably mounted into or in covering relationship to the aperture 320 in the tube sheet 316. The seal gasket 444 is axially against the clean air side 317 of the tube sheet 316. The bracket arrangement 446 matches up with fastener-receiving holes in the tube sheet 316. Fasteners are placed through the sockets 448 and into the receiving holes in the tube sheet 316. The fasteners are tightened, which pushes the flanges 476, 484, 486 in a direction toward the tube sheet 316. This causes a compression of the gasket 444 against the tube sheet 316, to form a seal therebetween. The gasket 444 cannot be over-compressed because the foot 480 on each of the flanges 476, 484, 486 will operate as a stop to prevent further axial motion of the filter cartridge 420 toward the tube sheet 316.

Figure 19:
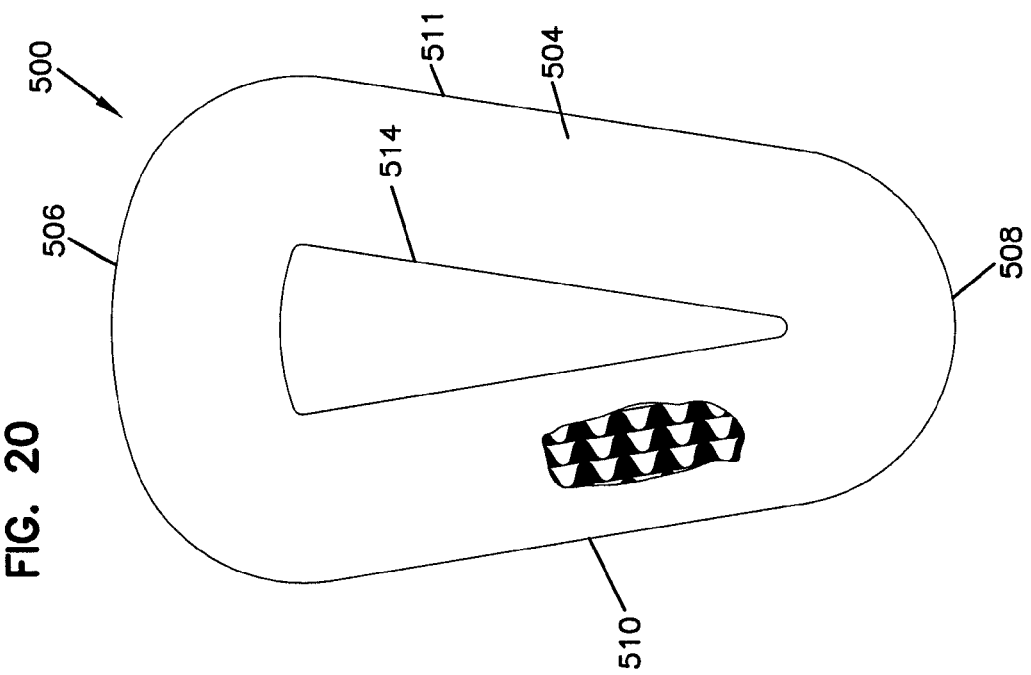
FIG. 19 is a top plan view of an alternate embodiment of a filter cartridge usable in any of the dust collectors depicted in FIGS. 8-12.

FIG. 19 illustrates an alternative embodiment of the filter cartridge 420. In FIG. 19, a cartridge 488 is shown, and includes a media pack 422 of strips 428 of single facer filter media material. The difference between the embodiment of FIGS. 13-18 and FIG. 19 is the trapezoidal perimeter shape. FIG. 19 shows an isocles trapezoid, in which the first edge 490 and second edge 492 have the same length as each other, although, they are non-parallel. The third edge 494 and fourth edge 496 are parallel to each other, although unequal in length. The angle between the first edge 490 and fourth edge 496 is the same as the angle between the second edge 492 and the fourth edge 496; while the angle between the third edge 494 and first edge 490 is the same as the angle between the third edge 494 and second edge 492.

Although the filter cartridge 488 depicted does not show panels, end caps, a gasket, or a mounting bracket, it should be understood that, in practice, it would include these or components similar to these as shown in FIGS. 15-18.

Figure 20:
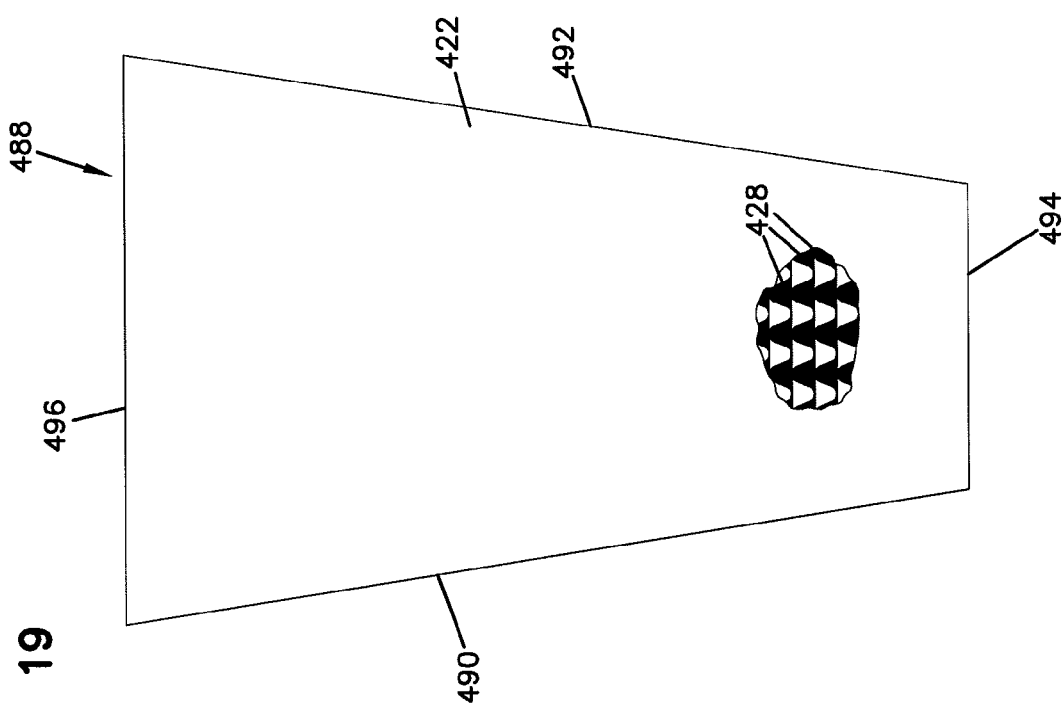
FIG. 20 is a top plan view of another embodiment of a filter cartridge usable with any of the dust collectors of FIGS. 8-12.

FIG. 20 illustrates another embodiment of a filter cartridge 500. In this embodiment, the media pack 502 is not stacked z-media, but rather, coiled z-media, such as described in connection with FIG. 6. The coiled media pack 502 includes a first flow face 504 and an opposite, second flow face, not shown in FIG. 20. In should be understood, however, that the flow face is similar to the flow faces shown in FIGS. 13-16. In the embodiment of FIG. 20, the media pack 502 has a first rounded end 506 and an opposite, second rounded end 508. Between the first and second rounded ends 506, 508 are first and second straight sides 510, 511 therebetween. The first rounded end 506 has a greater radius than the second rounded end 508.

In the embodiment shown, the cartridge 500 includes a non-circular core 514. The media pack 502 is wound or coiled around the core 514. In this embodiment, the core 514 is shown to be wedge or sector-shaped. Such an element 500 would permit it to operably mount within the dust collectors described herein that have a circular tube sheet 316, and help to reduce the amount of non-filtering material occupied by the tube sheet 316.

V. Dust Collector System, FIG. 21

Figure 21:
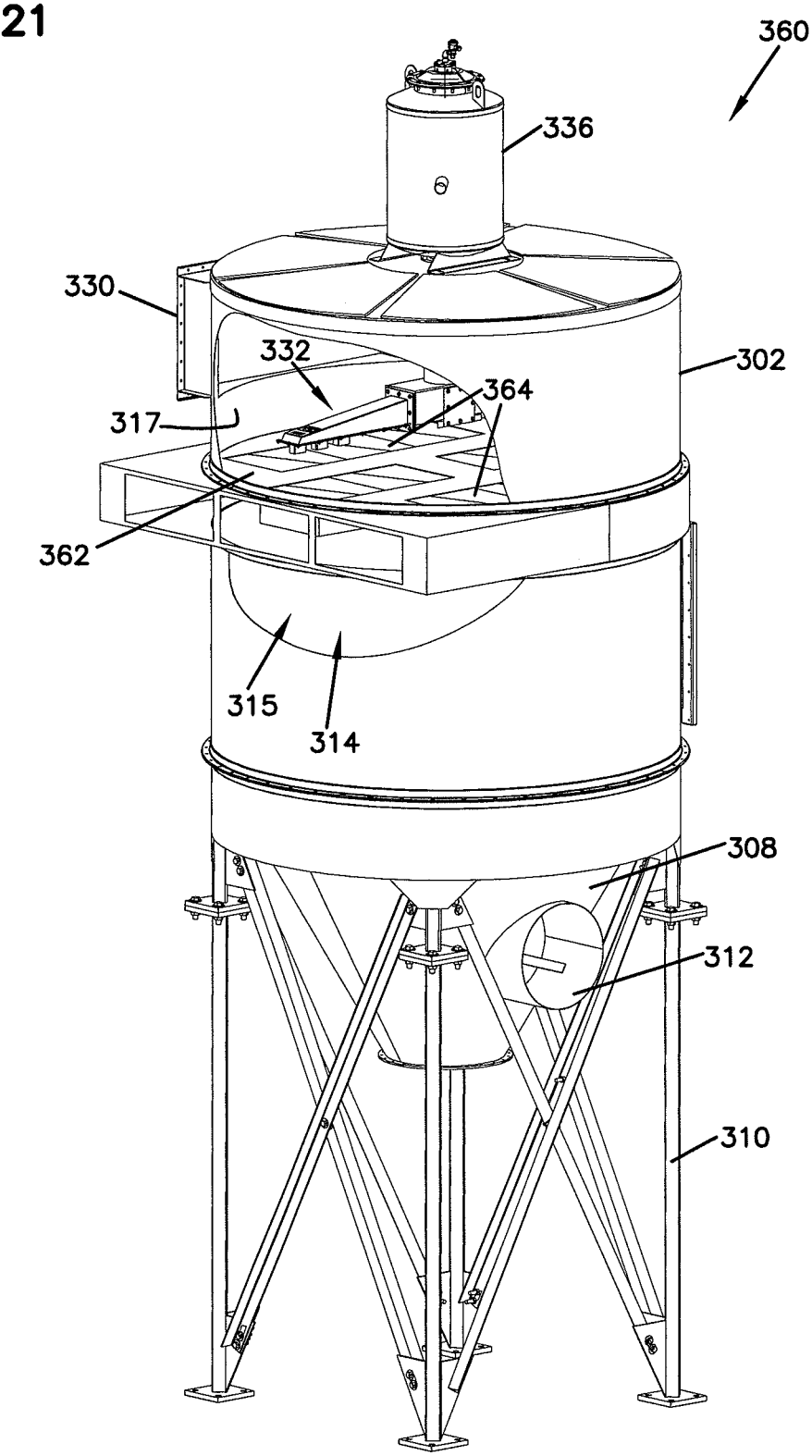
FIG. 21 is a schematic, perspective view of another embodiment of a dust collector utilizing z-filter media cartridges and having a reverse pulse cleaning system.

Turning now to the embodiment of FIG. 21, another dust collector is shown at 360. The dust collector 360 is similar to the dust collector 300 of FIG. 8, and common reference numerals will describe common parts. However, in the embodiment of FIG. 21, there is a different shaped tube sheet 362. In this embodiment, the tube sheet 362 is rectangular, even though the housing 302 is cylindrical. The tube sheet 362 includes a plurality of apertures 364 for holding filter cartridges.

In general, it is desirable to maximize the filter media in the tube sheet, which, theoretically, would be done by providing a filter the same size and shape of the collector housing/tube sheet. This is often not practical because of manufacturing difficulties and other problems, so in practice, smaller filter cartridges that can most effectively fill this space are typically utilized. When the housing is cylindrical, this can be problematic because the filter cartridge would have to change shape as the filter cartridge is located closer to the center of the tube sheet. One solution to this problem is illustrated in FIG. 21 by having inserted the rectangular tube sheet 362 between the dirty air side 315 and the clean air side 317 in order to increase the filter media area on the tube sheet 362.

Having a rectangular tube sheet 362 allows for using a filter cartridge with a rectangular perimeter. Rectangular filter cartridges populating a rectangular tube sheet 362 provide efficient utilization of the space of a tube sheet 362.

The rectangular filter cartridges utilized in the tube sheet 362 can be filter cartridges of the type described above in connection with FIGS. 1-7 using z-media.

VI. Nozzle Arrangements, FIGS. 22-27

Figure 25:
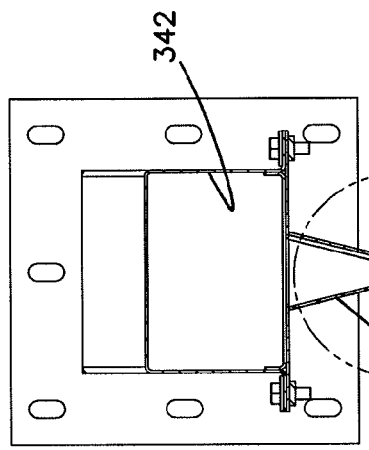
FIG. 25 is a cross sectional view of the arm of FIG. 24, the cross-section being taken along the line A-A of FIG. 24.
Figure 24:
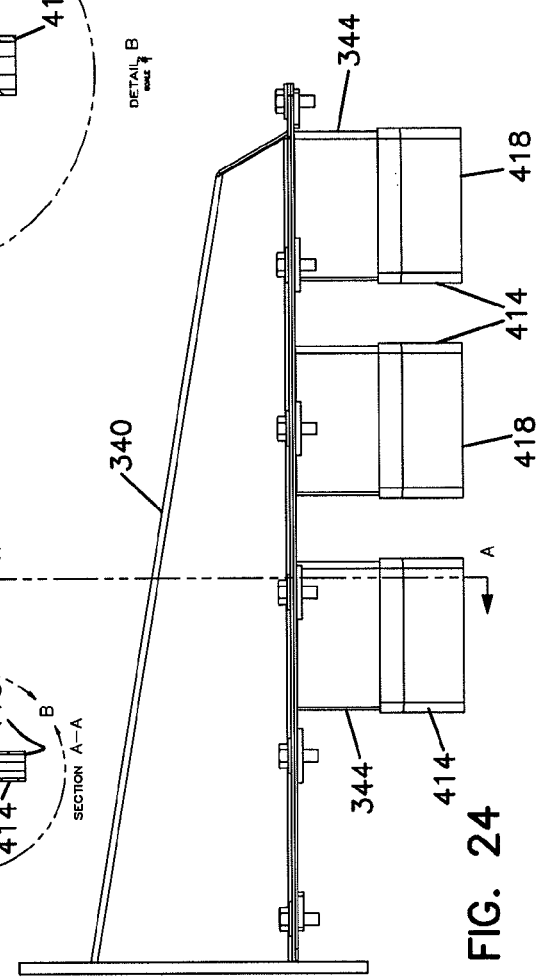
FIG. 24 is a side elevational view of the arm of FIG. 23.

As mentioned above in connection with the description of FIGS. 8-12, the arm arrangement 332, in this embodiment, includes an arm housing 340 and at least one nozzle 344. The embodiment shown includes a plurality of nozzles 344. The nozzles 344 are in air flow communication with the air distribution header 342 (FIG. 25).

Figure 29:
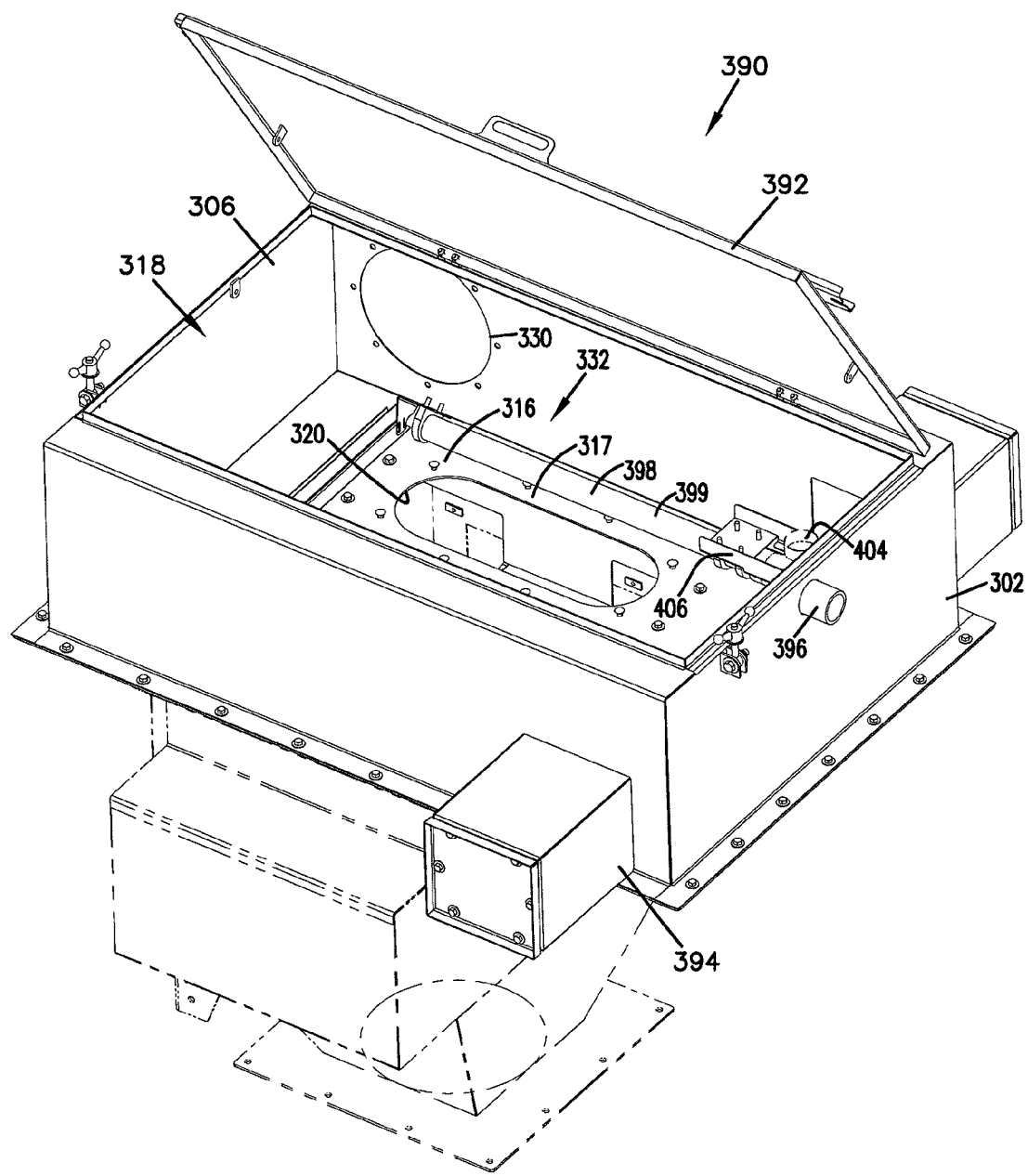
FIG. 29 is a schematic, perspective view of a portion of a dust collector usable with a cartridge of z-filter media and having translational movement of a reverse flow or a reverse pulse cleaning system.

As can be appreciated from reading the description of the embodiment of FIGS. 8-12, and the description of other embodiments of dust collectors, such as FIG. 21 and FIG. 29, these embodiments include the movable arm arrangement 332. The movable arm arrangement 332 is constructed and arranged to move across the filter cartridges 322 in order to direct an air stream at the downstream side 334 of the filter cartridges 322. As the arm arrangement 332 is moving, nozzles 344 are usually spaced some distance from the downstream side 334 of the flow face. If hard, rigid nozzles 344 were to physically contact the downstream side 334 of the filter cartridges 322, it may result in damaging the filter cartridges 322. On the other hand, the distance between the nozzle 344 and the downstream side 334 of the filter cartridges 322 reduce the effectiveness of the cleansing jet of air that is being emitted from the nozzles 334.

A solution to this problem is illustrated in FIGS. 22-26. In this embodiment, at least one of the nozzles 344, and preferably each of the nozzles 344 includes a flexible sleeve 414. The flexible sleeve 414, in the embodiment shown, is attached at a perimeter 416 of the exhaust nozzle 344 and extends down to contact or overlap the downstream side 334 of the filter cartridge 322. The flexible sleeve 414 can directly contact the filter cartridge 322, without damage. The flexible sleeve 414 will also reduce the problem of changes in the spacing between filter cartridges 322 and the nozzles 344 due to manufacturing tolerances in large dust collectors. In preferred embodiments, the entire nozzle 344 could be made entirely from a flexible material.

In convenient implementations, the distance between the downstream side 334 of the filter cartridge 322 and an endpoint 418 of the sleeve 414 will be less than 1.0 inch.

Preferred materials for the sleeve 414 include natural and synthetic rubber, urethane, foams, plastics, and other types of materials that result in a flexible, non rigid property.

VII. Air Knife and Translational Movement Systems, FIGS. 28-32

Figure 28:
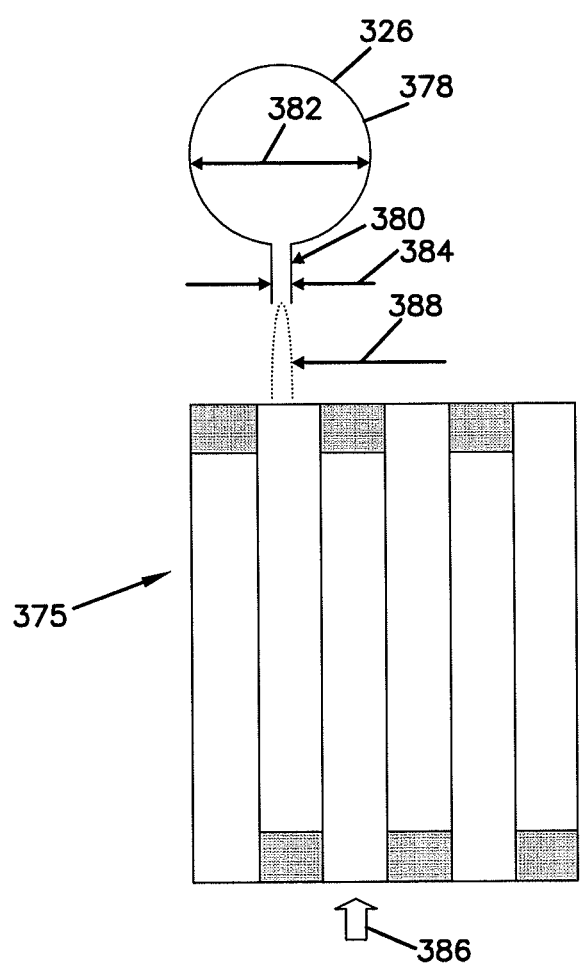
FIG. 28 is a schematic diagram illustrating principles of operation of an air knife on a media pack of z-filter medial
Figure 30:
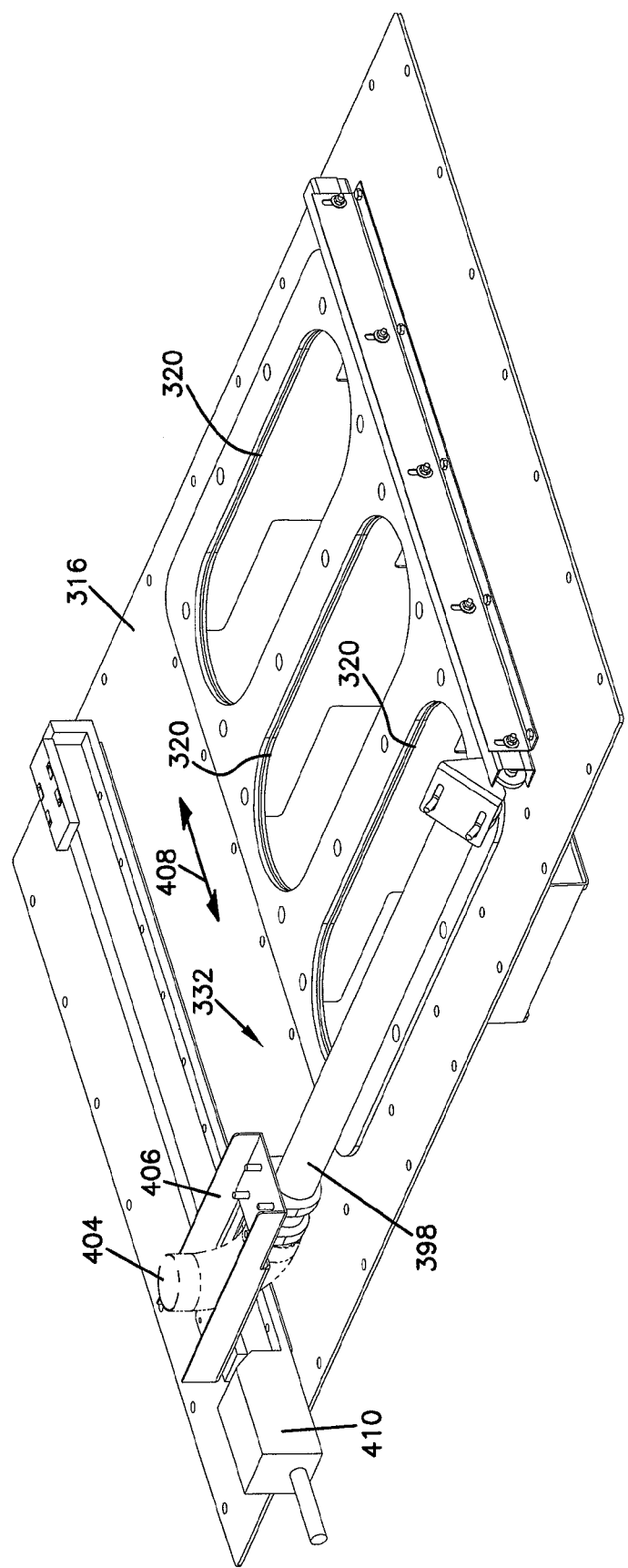
FIG. 30 is a perspective view of a portion of the dust collector of FIG. 29.
Figure 31:
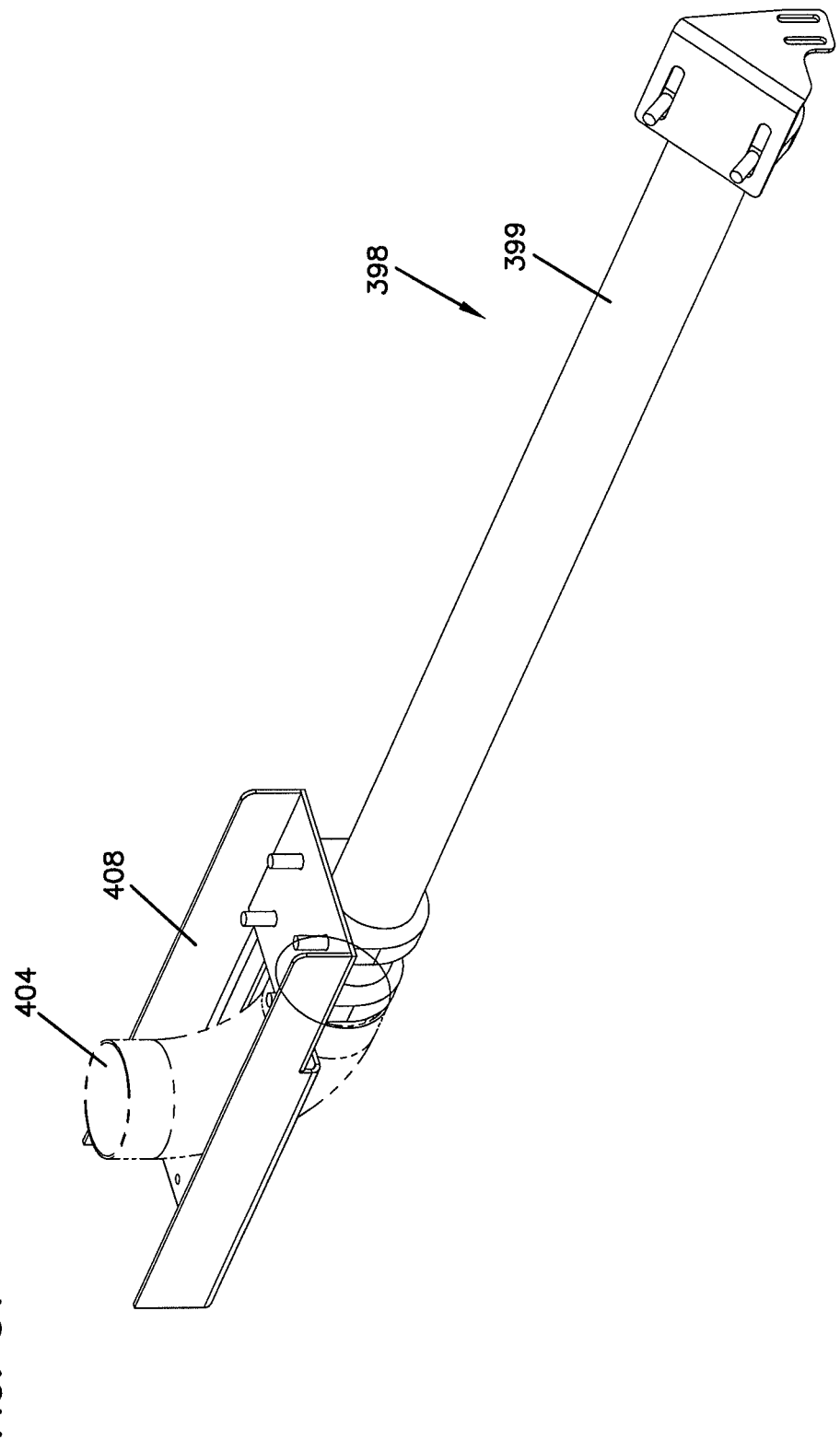
FIG. 31 is a perspective, schematic view of a portion of the dust collector of FIG. 29.
Figure 32:
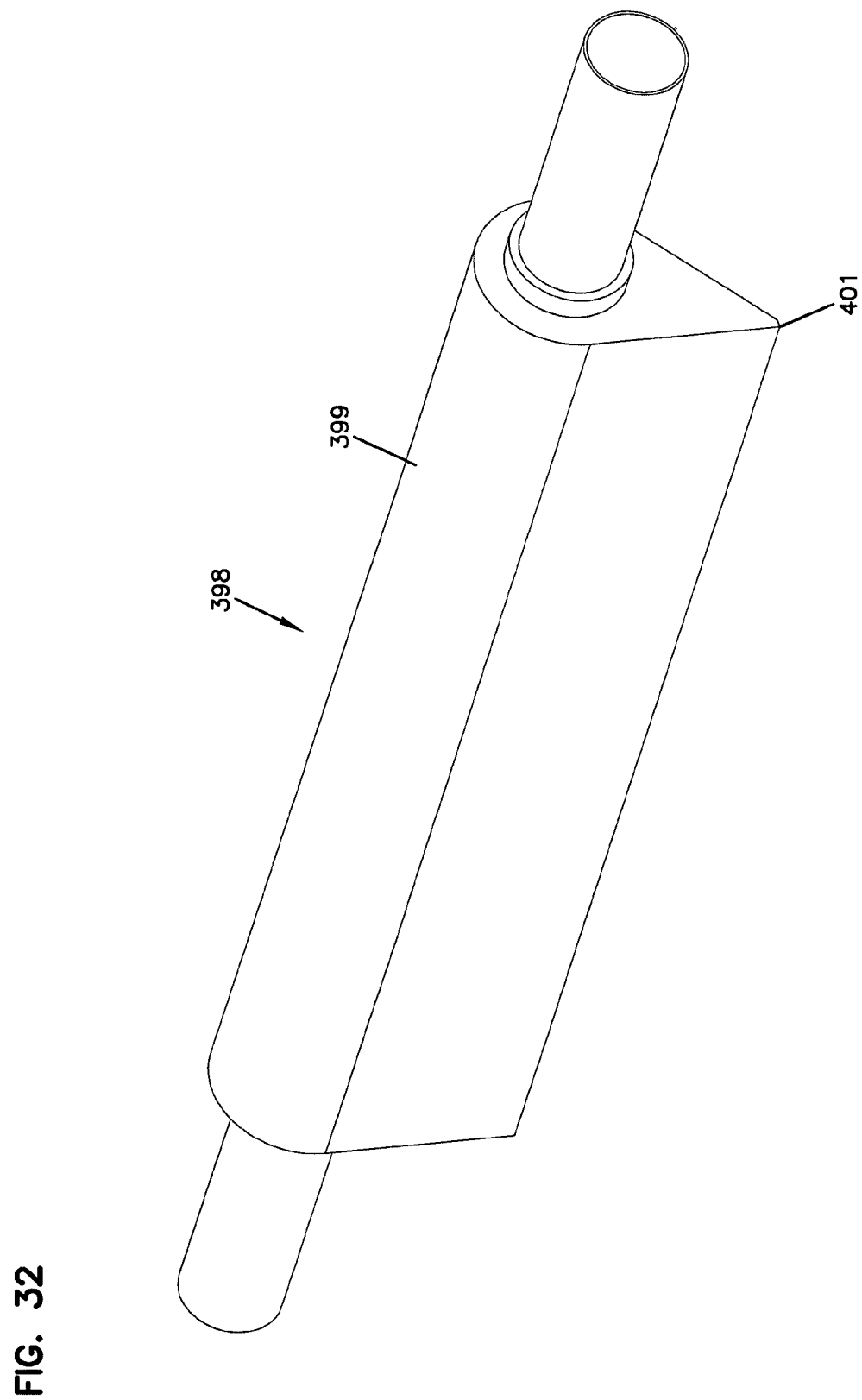
FIG. 32 is a perspective view of an air knife usable in the system of FIGS. 29 and 30.

FIG. 28 schematically shows a section of z-filter media 375, generally as described in connection with FIGS. 1-7 above. In the schematic of FIG. 28, the principles of using a very high velocity reverse flow cleaning method are shown. By the term "very high velocity" it is meant velocities of air at or greater than 10,000 feet per minute. These types of velocities can be utilized with an air knife, one embodiment which is illustrated in FIGS. 29-31.

A schematic representation of the air knife is shown at 326. The air knife 326 includes a manifold 378, which is an air flow communication with a pressure blower, not shown. The manifold 378 delivers the air from the pressure blower, and the air flows from the manifold 378 through a nozzle 380.

The manifold 378 will have a width, which can be a diameter shown at 382. The nozzle 380 will have a width of 384. It has been found that for effective, efficient cleaning of the z-media 375, the width 384 of the nozzle 380 should be in the range of 0.05-0.0025 times the width 382 of the manifold 378. Preferably, the width 384 is about 0.015 times the width 382 of the manifold 378. This provides for an effective distribution and velocity for cleaning the z-media 375.

FIG. 28 also shows dirty air flow 386 and clean air flow 388.

The embodiment of FIGS. 29-32 show a dust collector 390 that utilize the principles of the air knife of FIG. 28. While in the embodiments of FIGS. 8-12, the arm arrangement 332 was movable by rotating about a central, longitudinal axis, in the embodiment of FIGS. 29 and 30, the arm arrangement 332 moves in a translational direction, such as bi-directionally in a single plane over the at least one filter cartridge 322.

In FIG. 29, the housing 302, in this embodiment, is rectangular in cross-section. It defines a clean air outlet 330 in the side of the housing 302. The tube sheet 316 can be seen in FIG. 29, and the clean air side 317 of the tube sheet 316 resting in the clean air volume 318 is also visible. The dust collector 390 includes an access door 392 to allow selective access to the clean air volume 318 in order to service the filter cartridges mounted over the aperture 320 in the tube sheet 316. In FIG. 29, it should be noted, the filter cartridges 322 are not shown, for purposes of clarity of understanding.

Also, illustrated in the embodiment of FIG. 29 is a housing 394 for a linear actuator motor. A connector 396 is shown for a high pressure blower.

In the interior volume 306, specifically the clean air volume 318 of the housing 302, an embodiment of an air knife 398 is shown. The air knife 398 includes a manifold 399 and a nozzle 401 (FIG. 32) for delivering a jet of air at a very high velocity.

The air knife 398 is secured to a pressure blower (not shown) at fitment 404, as shown in phantom lines.

In this embodiment, the arm arrangement 332 includes at least one arm 406 that moves laterally, or by-directionally across the tube sheet as shown at arrow 408. A linear actuator 410 moves the arm 406 non-rotationally, in a line back and forth as shown at 408. The arm 406, in this embodiment, includes the air knife 398. In other embodiments, something other than an air knife could be used, such as the same types of arm arrangements 332 utilized above in connection with FIGS. 8-12.

The air knife 398 is constructed and arranged to deliver a jet of air a velocity of greater than 10,000 feet per minute at the downstream side of the filter cartridges 322 mounted over or within the apertures 320 in the tube sheet 316. Preferably, the air knife 398 is constructed and arranged to deliver a jet of air at a velocity of greater than 26,000 feet per minute.

One particularly useful embodiment includes filter cartridges 322 having z-media of the type described in connection with FIGS. 1-7 and utilizing an air knife where a width of the nozzle is 0.05-0.0025 times the diameter of the manifold. In one preferred implementation, a width of nozzle is about 0.015 times the diameter of the manifold.

VIII. Example Principles

An air filter cartridge is provided an may include: a media pack having first and second opposite flow faces; the media pack comprising a stack of strips of single facer filter media material, each strip including a fluted media sheet secured to a facing media sheet and oriented with flutes of each fluted sheet extending in a direction between the first and second, opposite, flow faces; the first flow face comprising a planar inlet flow face with a non-rectangular perimeter shape; a seal gasket extending around the media pack; and a mounting bracket arrangement secured to the media pack defining at least one fastener socket to allow mounting of the filter cartridge to a tube sheet.

Each strip of single facer may have a facing sheet that is non-fluted.

Each flow face may have a non-circular perimeter shape.

The first flow face may have a trapezoidal perimeter shape.

The media pack may include first and second, opposite, sides extending between the first and second, opposite, flow faces; each one of the first and second sides being a least partially secured to a corresponding one of first and second side panels.

A perimeter definition of the inlet flow face may include: first and second, opposite, non-parallel edges of different length; and third and fourth, parallel, edges of different lengths.

The first edge may extend generally perpendicular to the third and fourth edges.

The media pack may have a first pair of opposite sides; and a second pair of opposite sides; the first pair of opposite sides comprising first and second sides extending between the first flow face and the second flow face and engaging the first flow face along first and second edges; the first edge having a different length than the second edge; and the second pair of opposite sides comprising third and fourth sides extending between the first and second opposite, flow faces and also between the first and second sides; the second pair of opposite sides engaging the first flow face along third and fourth edges.

The first side may extend in a plane non-parallel to the second side.

The third edge may be shorter than the fourth edge.

The third side may extend in a plane generally parallel to the fourth side.

A ratio of the third edge to the fourth edge can be 0.5-0.6.

A ratio of the third edge to the first edge can be 0.3-0.4.

A ratio of the fourth edge to the first edge can be 0.6-0.8.

An angle between the fourth edge and the second edge can be 70-75 degrees.

The mounting bracket arrangement may include at least a first flange arrangement radially extending from the third side; the first flange arrangement defining a first fastener socket.

The mounting bracket arrangement may include at least a second flange arrangement radially extending from the fourth side; the second flange arrangement defining a second and third fastener socket.

The second flange arrangement may include a pair of linearly spaced flanges.

The mounting bracket arrangement may include a plurality of flanges; each of the flanges being linearly spaced from each other; and at least one of the flanges being spaced radially at least one other in the plurality.

The media pack may be surrounded by a pair of side panels and a pair of end caps; and the gasket member may be secured to an end of the side panels and end caps and projects beyond a plane of the first flow face.

An air filter cartridge is provided and may include a coiled media pack having a first flow face and an opposite second flow face; the media pack including: a set of inlet flutes open at the first flow face to passage of air to be filtered therein; a set of outlet flutes open at the second flow face; the media pack being closed to flow of unfiltered air into the first flow face and then outwardly from the second flow face without filtering;
the media pack having first and second rounded ends with first and second straight sides therebetween; and the first rounded end having a greater radius than the second rounded end.

The cartridge may include a non-circular core; the media pack may be wound around the core.

The core may be generally sector-shaped.

A dust collector is provided and may include: a housing having a dirty air inlet and a clean air outlet; a blower arrangement to direct air from the dirty air inlet to the clean air outlet; a tube sheet separating a dirty air side and a clean air side; the tube sheet defining at least one aperture; at least one filter cartridge removably mounted to cover the aperture in the tube sheet; the filter cartridge including a media pack having a first flow face and an opposite second flow face; the media pack having: a set of inlet flutes open at the first flow face to passage of air to be filtered therein; a set of outlet flutes open at the second flow face; the media pack being closed to flow of unfiltered air into the first flow face and then outwardly from the second flow face without filtering; the filter cartridge being oriented to clean air as it flows from the dirty side, through the first flow face of the media pack and then through the second flow face of the media pack to the clean air side; and an arm arrangement movably mounted in the clean air side oriented to move over the at least one filter cartridge and direct a jet of air through the second flow face of the at least one filter cartridge to the first flow face The arm arrangement may be operably connected to a compressed air tank.

The arm arrangement may include at least one arm mounted to rotate about a central axis over the at least one filter cartridge.

The arm arrangement may include at least a pair of arms mounted to rotate about a central axis over the at least one filter cartridge.

The tube sheet may define a plurality of apertures; and the at least filter cartridge may include a plurality of filter cartridges, such as filter cartridges characterized above.

The housing may be cylindrical; the tube sheet may be rectangular; and the at least one filter cartridge may have a rectangular perimeter.

The arm arrangement may include a plurality of nozzles; and at least one of the nozzles may include a flexible sleeve extending therefrom.

The arm arrangement may include at least one arm mounted to move bi-directionally in a single plane over the at least one filter cartridge.

The arm arrangement is operably connected to a compressed air tank and may be constructed and arranged to periodically direct a pulse of air at a pressure of 3 psi-15 psi.

The arm arrangement is operably connected to a compressed air tank and may be constructed and arranged to periodically direct a pulse of air at a pressure of greater than 15 psi.

The arm arrangement is operably connected to the blower and may be constructed and arranged to constantly direct a stream of air at a pressure of less than 3 psi.

The arm arrangement may include an air knife constructed and arranged to deliver a jet of air at a velocity of greater than 10,000 feet/minute.

The arm arrangement may include an air knife constructed and arranged to deliver a jet of air at a velocity of greater than 26,000 feet/minute.

The air knife may include a manifold and a nozzle; the manifold defining a diameter and the nozzle defining a width; a width of the nozzle may be 0.05 to 0.0025 times the diameter of the manifold. A width of the nozzle may be about 0.015 times the diameter of the manifold.

The above are principles. Many embodiments can be made applying these principles.

What is claimed is:

1. An air filter cartridge comprising:
   (a) a coiled media pack having a first flow face and an opposite second flow face; the media pack including:
       (i) a set of inlet flutes open at the first flow face to passage of air to be filtered therein;
       (ii) a set of outlet flutes open at the second flow face;
       (iii) the media pack being closed to flow of unfiltered air into the first flow face and then outwardly from the second flow face without filtering;
   (b) the media pack having first and second rounded ends with first and second straight sides in complete extension therebetween; and
       (i) the first rounded end having a greater radius than the second rounded end.

2. An air filter cartridge according to claim 1 further comprising:
   (a) a non-circular core; the media pack being wound around the core.

3. An air filter cartridge according to claim 2 wherein:
   (a) the core is generally sector-shaped.

4. An air filter cartridge according to claim 1 wherein:
   (a) the first flow face is planar.

5. An air filter cartridge according to claim 1 wherein:
   (a) the coiled media pack includes fluted sheet secured to a facing sheet.

6. An air filter cartridge according to claim 5 further comprising:
   (a) a wedge-shaped core; the media pack being wound around the core.

7. An air filter cartridge according to claim 3 wherein:
   (a) the first and second flow faces are planar; and (b) the coiled media pack includes fluted sheet secured to a facing sheet.

* * * * *